(12) United States Patent
Utsuno et al.

(10) Patent No.: US 10,303,079 B2
(45) Date of Patent: May 28, 2019

(54) ELECTROPHOTOGRAPHIC MEMBER, PROCESS CARTRIDGE AND ELECTROPHOTOGRAPHIC APPARATUS

(71) Applicant: CANON KABUSHIKI KAISHA, Tokyo (JP)

(72) Inventors: Fumihiko Utsuno, Suntou-gun (JP); Masaki Yamada, Mishima (JP); Hiroaki Komatsu, Fuji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/647,899

(22) Filed: Jul. 12, 2017

(65) Prior Publication Data
US 2018/0039200 A1    Feb. 8, 2018

(30) Foreign Application Priority Data

Aug. 4, 2016    (JP) .................. 2016-153945

(51) Int. Cl.
| | |
|---|---|
| *G03G 15/02* | (2006.01) |
| *C08J 7/12* | (2006.01) |
| *G03G 5/02* | (2006.01) |
| *G03G 15/08* | (2006.01) |
| *G03G 21/18* | (2006.01) |

(Continued)

(52) U.S. Cl.
CPC .......... *G03G 15/0233* (2013.01); *C08J 7/123* (2013.01); *G03G 5/02* (2013.01); *G03G 5/14765* (2013.01); *G03G 5/14769* (2013.01); *G03G 5/14786* (2013.01); *G03G 5/14791* (2013.01); *G03G 15/0818* (2013.01); *G03G 21/18* (2013.01); *G03G 21/1853* (2013.01); *G03G 15/0812* (2013.01); *G03G 21/0017* (2013.01); *G03G 2215/00683* (2013.01)

(58) Field of Classification Search
CPC .................................................. G03G 15/023
See application file for complete search history.

(56) References Cited

U.S. PATENT DOCUMENTS

| | | | | |
|---|---|---|---|---|
| 4,810,292 A | * | 3/1989 | Palmer .................. | C09D 11/38 |
| | | | | 106/31.43 |
| 7,797,833 B2 | | 9/2010 | Nakamura et al. | |
| 7,799,398 B2 | | 9/2010 | Nakamura et al. | |

(Continued)

FOREIGN PATENT DOCUMENTS

| | | |
|---|---|---|
| JP | 4392745 A | 1/2010 |
| JP | 5623067 A | 11/2014 |
| JP | 2015232701 A | 12/2015 |

OTHER PUBLICATIONS

Machine translation of JP 2015004724 by Hori et al. (Year: 2015).*

(Continued)

*Primary Examiner* — Michael M Dollinger
*Assistant Examiner* — Christina H. W. Rosebach
(74) *Attorney, Agent, or Firm* — Venable LLP

(57) ABSTRACT

Provided an electrophotographic member that contributes to the formation of a higher grade of an electrophotograph than ever for use in an ultralow-temperature environment.
The electrophotographic member has an electro-conductive resin layer, and the resin layer comprises a resin having a specific structure and an anion.

5 Claims, 6 Drawing Sheets

(51) Int. Cl.
*G03G 5/147* (2006.01)
*G03G 21/00* (2006.01)

(56) References Cited

U.S. PATENT DOCUMENTS

| | | |
|---|---|---|
| 8,600,273 B2 | 12/2013 | Yamada et al. |
| 8,655,222 B2 | 2/2014 | Nakamura et al. |
| 8,706,011 B2 | 4/2014 | Anan et al. |
| 8,768,226 B2 | 7/2014 | Koyanagi et al. |
| 8,768,227 B2 | 7/2014 | Urushihara et al. |
| 8,774,677 B2 | 7/2014 | Sakurai et al. |
| 8,798,508 B2 | 8/2014 | Yamada et al. |
| 8,837,985 B2 | 9/2014 | Ishida et al. |
| 8,846,287 B2 | 9/2014 | Yamada et al. |
| 8,874,007 B2 | 10/2014 | Kawamura et al. |
| 8,874,012 B2 | 10/2014 | Yamada et al. |
| 8,913,930 B2 | 12/2014 | Ishii et al. |
| 9,581,931 B2 | 2/2017 | Yamada et al. |
| 9,599,913 B2 | 3/2017 | Nishioka et al. |
| 9,639,009 B2 | 5/2017 | Yamaguchi et al. |
| 9,665,028 B2 | 5/2017 | Arimura et al. |
| 2015/0266327 A1* | 9/2015 | Zama ................ B41M 5/52 428/328 |
| 2015/0331339 A1 | 11/2015 | Yamada et al. |
| 2015/0331340 A1 | 11/2015 | Nishioka et al. |
| 2015/0331342 A1 | 11/2015 | Yamaguchi et al. |
| 2015/0331346 A1 | 11/2015 | Yamauchi et al. |
| 2015/0331347 A1 | 11/2015 | Arimura et al. |
| 2016/0187801 A1 | 6/2016 | Yamada et al. |
| 2016/0187809 A1 | 6/2016 | Yamaguchi et al. |
| 2017/0060007 A1 | 3/2017 | Yamada et al. |
| 2017/0227880 A1 | 8/2017 | Koyanagi et al. |

OTHER PUBLICATIONS (2007). Resin. In Hawley's Condensed Chemical Dictionary, R. J. Lewis (Ed.). doi:10.1002/9780470114735.hawley13951 (Year: 2007).*
Translation of WO 2012084777 by Gibon et al. (Year: 2012).*
U.S. Appl. No. 15/493,282, filed Apr. 21, 2017, Shohei Urushihara.
U.S. Appl. No. 15/634,362, filed Jun. 27, 2017, Hideya Arimura.

* cited by examiner

ELECTROPHOTOGRAPHIC MEMBER, PROCESS CARTRIDGE AND ELECTROPHOTOGRAPHIC APPARATUS

BACKGROUND OF THE INVENTION

Field of the Invention

The present invention relates to an electrophotographic member for use in an electrophotographic apparatus, and a process cartridge and an electrophotographic apparatus having the electrophotographic member.

Description of the Related Art

In electrophotographic apparatuses (copiers, facsimiles, printers and the like using an electrophotographic system), an electrophotographic photosensitive member (hereinafter, also referred to as a "photosensitive member") is charged by a charging unit and exposed to laser or the like so that an electrostatic latent image is formed on the photosensitive member. Subsequently, toner in a development container is applied onto a toner carrying member by a toner feed roller and a toner layer thickness regulating member. The toner conveyed to a development region by the toner carrying member develops the electrostatic latent image on the photosensitive member at the contact portion between the photosensitive member and the toner carrying member or a portion proximal thereto. Then, the toner image on the photosensitive member is transferred to recording paper by a transferring unit and fixed by heat and pressure to form an image. Toner remaining on the photosensitive member is removed by a cleaning blade.

In such electrophotographic apparatuses which are image forming apparatuses adopting an electrophotographic system, an electro-conductive member is used for various purposes, for example, as a toner carrying member, a charging member, a toner feed roller, a cleaning blade and a toner layer thickness regulating member. The electrical resistance values of these electro-conductive members need to be controlled to $1\times10^5$ to $1\times10^9 \Omega$ without depending on usage conditions and a usage environment. Such an electro-conductive member is provided with an electro-conductive layer supplemented with electro-conductive fine particles typified by carbon black or an ionic electro-conductive agent such as a quaternary ammonium salt compound in order to adjust its electro-conductivity. These two types of electro-conductive agents each have advantages and disadvantages as mentioned below.

An electronic electro-conductive member prepared by the addition of electro-conductive fine particles such as carbon black has the advantages that: its electrical resistance value varies less in a usage environment; and the electronic electro-conductive member is less likely to contaminate other members upon contact. The electro-conductive fine particles such as carbon black, however, are difficult to uniformly disperse and may generate a local site with low resistance.

On the other hand, an ionic electro-conductive member prepared by the addition of an ionic electro-conductive agent can reduce variations in electrical resistance value attributed to the nonuniform dispersion of the electro-conductive agent and is less likely to generate a local site with low resistance, as compared with the electronic electro-conductive member. Depending on an environment, however, its resistance value varies easily. Therefore, the ionic electro-conductive member may not obtain a desired resistance value in a low-temperature and low-humidity environment. As a means for suppressing environmental variations in the resistance value of the ionic electro-conductive agent, Japanese Patent No. 4392745 discloses a method using an ionic liquid having a specific chemical structure for a rubber composition. Also, Japanese Patent No. 5623067 discloses a method using an ionic liquid having a hydroxy group in a urethane resin composition.

In recent years, electrophotographic apparatuses have been required to be able to maintain high image quality and high durability even in a more severe environment. Incidentally, an electro-conductive layer containing an ionic liquid is excellent in reducing variations in electrical resistance value. However, when this electro-conductive layer is used in a low-temperature environment, its electro-conductivity may be reduced due to change in the state of the resin (crystallinity of the resin) at the low temperature. The study of the present inventors has demonstrated that when the composition described in Japanese Patent No. 4392745 is used in a low-temperature environment of 0° C., influence on electrophotographic images is particularly significant.

SUMMARY OF THE INVENTION

One aspect of the present invention is directed to providing an electrophotographic member that contributes to the formation of a higher grade of an electrophotograph than ever for use in an ultralow-temperature environment. Another aspect of the present invention is directed to providing a process cartridge and an electrophotographic apparatus that can stably form a high grade of an electrophotographic image.

According to one aspect of the present invention, there is provided an electrophotographic member having an electro-conductive resin layer, the resin layer comprising a resin and an anion, the resin having at least one cationic structure selected from the group consisting of the structural formulas (1), (2) and (3), and a structure of at least one of the structural formulas (4) and (5):

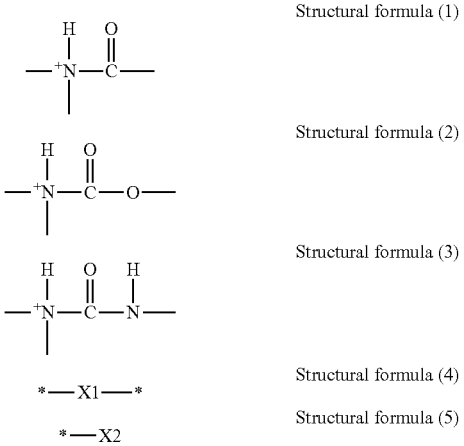

In the structural formulas (4) and (5), a symbol "*" represents a binding moiety for the nitrogen cation in the resin having at least one structure selected from the group consisting of the structural formulas (1), (2) and (3).

In the structural formula (4), X1 represents at least one structure selected from the group consisting of the structural formulas (X101) to (X105) given below.

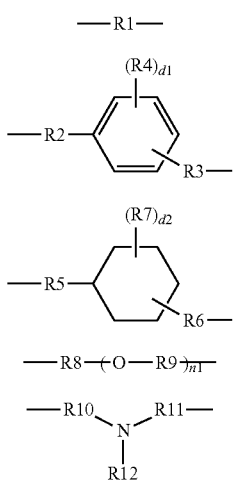

Structural formula (X101)

Structural formula (X102)

Structural formula (X103)

Structural formula (X104)

Structural formula (X105)

In the structural formula (X101), R1 represents a divalent saturated or unsaturated hydrocarbon group having a linear moiety having at least 4 or more carbon atoms.

In the structural formula (X102), R2 and R3 each independently represent a divalent hydrocarbon group having or more and 4 or less carbon atoms. R4 represents a hydrocarbon group having 1 or more and 4 or less carbon atoms. d1 represents 0 or 1.

In the structural formula (X103), R5 and R6 each independently represent a divalent hydrocarbon group having or more and 4 or less carbon atoms. R7 represents a hydrocarbon group having 1 or more and 4 or less carbon atoms. d2 represents 0 or 1.

In the structural formula (X104), R8 and R9 each independently represent a divalent hydrocarbon group having 2 or more and 4 or less carbon atoms. n1 represents an integer of 1 or larger and 4 or smaller.

In the structural formula (X105), R10 and R11 each independently represent a divalent hydrocarbon group having 2 or more and 4 or less carbon atoms. R12 represents a hydrogen atom or a hydrocarbon group having 1 or more and 4 or less carbon atoms.

In the structural formula (5), X2 represents at least one structure selected from the group consisting of the structural formulas (X201) to (X205) given below.

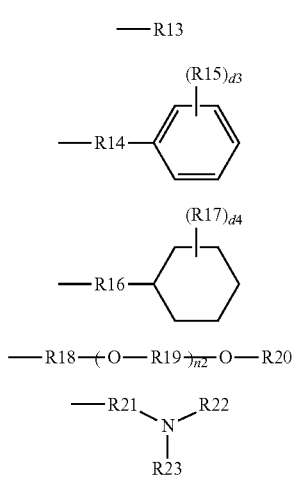

Structural formula (X201)

Structural formula (X202)

Structural formula (X203)

Structural formula (X204)

Structural formula (X205)

In the structural formula (X201), R13 represents a hydrocarbon group having 1 or more carbon atoms.

In the structural formula (X202), R14 represents a divalent hydrocarbon group having 1 or more and 4 or less carbon atoms. R15 represents a hydrocarbon group having 1 or more and 4 or less carbon atoms. d3 represents an integer of 0 or larger and 2 or smaller.

In the structural formula (X203), R16 represents a divalent hydrocarbon group having 1 or more and 4 or less carbon atoms. R17 represents a hydrocarbon group having 1 or more and 4 or less carbon atoms. d4 represents an integer of 0 or larger and 2 or smaller.

In the structural formula (X204), R18 and R19 each independently represent a divalent hydrocarbon group having 2 or more and 4 or less carbon atoms. n2 represents an integer of 1 or larger and 4 or smaller. R20 represents a hydrocarbon group having 1 or more and 6 or less carbon atoms.

In the structural formula (X205), R21 represents a divalent hydrocarbon group having 2 or more and 4 or less carbon atoms. R22 and R23 each independently represent a hydrogen atom or a monovalent hydrocarbon group having 1 or more and 4 or less carbon atoms.

According to another aspect of the present invention, there is provided a process cartridge detachably attached to the main body of an electrophotographic apparatus, wherein at least one electrophotographic member constituting the process cartridge is the electrophotographic member described above.

According to a further alternative aspect of the present invention, there is provided an electrophotographic apparatus including an electrophotographic photosensitive member, wherein at least one electrophotographic member constituting the electrophotographic apparatus is the electrophotographic member described above.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors have conducted studies to obtain an electrophotographic member that permits formation of a high grade of an electrophotographic image even when used in an ultralow-temperature environment. As a result, the present inventors have completed the present invention by finding that an electrophotographic member containing a resin having a specific chemical structure, and a specific anion in a resin layer suppresses reduction in electro-conductivity even in a low-temperature environment of 0° C.

(1) Electrophotographic Member

The electrophotographic member according to one aspect of the present invention is an electrophotographic member having an electro-conductive resin layer. The resin layer contains a resin having at least one cationic structure selected from the group consisting of the structural formulas (1), (2) and (3), and an anion. The resin further has a structure of at least one of the structural formulas (4) and (5). The electrophotographic member according to one embodiment of the present invention has an electro-conductive substrate and the electro-conductive resin layer on the substrate. In the present invention, the electrophotographic member includes a toner carrying member, a charging member, a toner feed roller, a developing blade, a cleaning blade and the like.

Figure 1A:
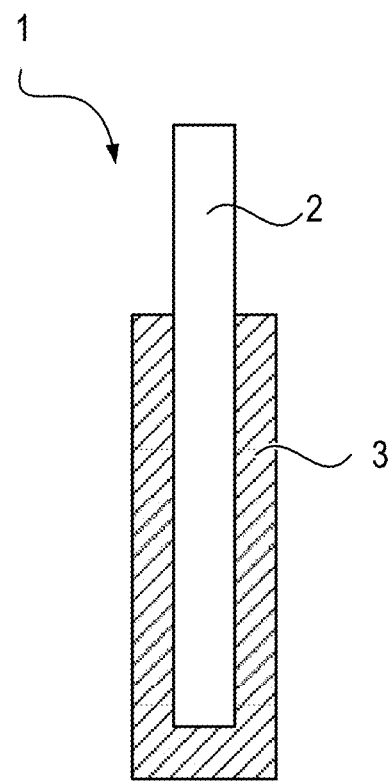
FIGS. 1A and 1B are cross-sectional views schematically illustrating an electrophotographic blade according to one aspect of the present invention.
Figure 1B:
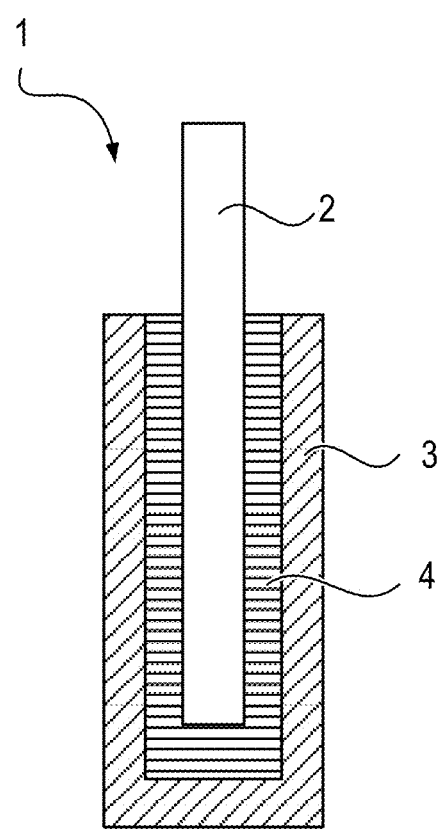

One example of the electrophotographic member includes a blade-shaped electrophotographic member (electrophotographic blade). Each of FIGS. 1A and 1B is a cross-sectional view schematically illustrating the electrophotographic blade. An electrophotographic blade 1 illustrated in FIG. 1A is constituted by an electro-conductive substrate 2 and an electro-conductive resin layer disposed on the outer periphery thereof. In an electrophotographic blade illustrated in FIG. 1B, an elastic layer 4 is further disposed between the substrate 2 and the resin layer 3.

Figure 2A:
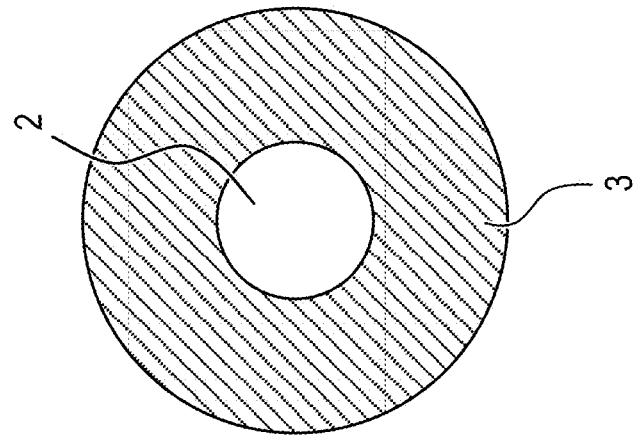
FIGS. 2A, 2B and 2C are cross-sectional views schematically illustrating an electrophotographic roller according to one aspect of the present invention.
Figure 2B:
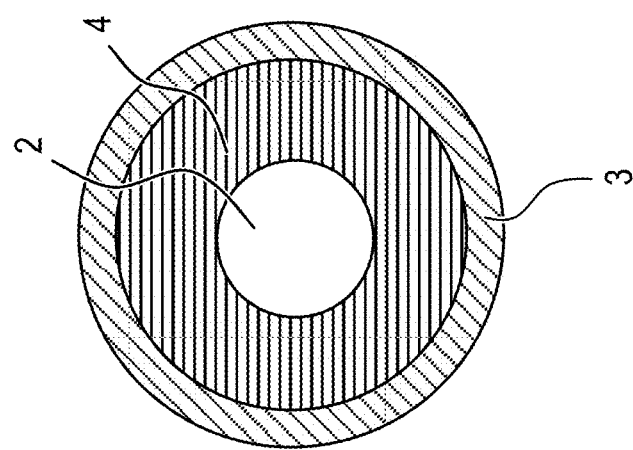
Figure 2C:
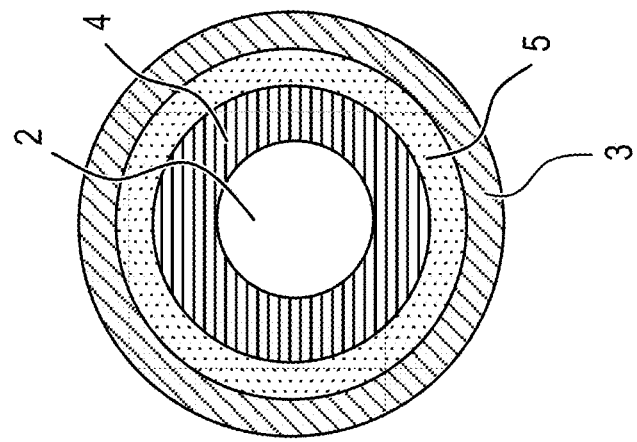

Another example of the electrophotographic member includes a roller-shaped electrophotographic member (electrophotographic roller). Each of FIGS. 2A, 2B and 2C is a cross-sectional view schematically illustrating the electrophotographic roller. An electrophotographic roller illustrated in FIG. 2A has an electro-conductive substrate 2 and an electro-conductive resin layer 3 disposed on the outer periphery thereof. As illustrated in FIG. 2B, an elastic layer 4 may be further disposed between the substrate and the resin layer 3. Alternatively, the electrophotographic roller may have, as illustrated in FIG. 2C, a three-layer structure where an intermediate layer 5 is placed between the elastic layer 4 and the resin layer 3, or may have a multilayer structure where a plurality of intermediate layers 5 are placed. In the electrophotographic roller, as illustrated in FIGS. 2A to 2C, the resin layer 3 can reside as the outermost layer of the electrophotographic roller in order to more effectively exert effects according to one embodiment of the present invention. Also, the electrophotographic roller can have the elastic layer 4. The layer structure of the electrophotographic roller is not limited to the one in which the resin layer 3 resides as the outermost layer of the electrophotographic roller. Specific examples of the electrophotographic roller include an electrophotographic roller further having a surface layer on the substrate 2 and the electro-conductive resin layer 3 disposed on the outer periphery thereof, and an electrophotographic roller having the resin layer 3 as the intermediate layer 5.

The electrophotographic member may be used as a developing roller, a charging member, a toner feed roller, a developing blade and a cleaning blade. Particularly, the electrophotographic member can be suitably used as a developing roller, a developing blade and a toner feed roller. Hereinafter, the configuration of the electrophotographic member according to one embodiment of the present invention will be described in detail.

<Substrate>

First, the electrophotographic blade as the electrophotographic member according to one aspect of the present invention will be described below.

The substrate 2 also functions as a supporting member and in some cases, an electrode, in the electrophotographic blade. The substrate 2 may be made of any material such as a metal or a resin. Specific examples thereof can include: metals such as stainless steel, phosphor bronze and aluminum; and resins such as polyethylene terephthalate, acryl, polyethylene and polyester. In the case of using a resin and also requiring electro-conductivity, an electro-conductive material can be added to the resin. In the case of using a single resin layer 3 and a single substrate 2, the same material as that for the resin layer 3 is also used in the substrate 2. For the blade-shaped electrophotographic member, the substrate 2 is in the shape of a thin plate.

The thickness of the substrate 2 is not particularly limited and can be 0.05 mm or larger and 0.15 mm or smaller when the resin layer 3 and the substrate 2 are made of different materials in the shape illustrated in FIG. 1A. When the thickness of the substrate 2 is 0.05 mm or larger, a developer layer thickness regulating member can be contacted with a developer carrying member at an adequate contact pressure to thereby regulate toner on the developer carrying member to an adequate layer thickness. On the other hand, when the thickness of the substrate 2 is 0.15 mm or smaller, a developing blade easily follows a developer carrying member, and spring properties that impart necessary pressure to toner are obtained.

When the resin layer 3 and the substrate 2 are made of a single material which is a resin, the thickness of the substrate 2 can be 0.5 mm or larger and 2.0 mm or smaller. When the thickness of the substrate 2 is 0.5 mm or larger, a developer layer thickness regulating member can be contacted with a developer carrying member at an adequate contact pressure to thereby regulate toner on the developer carrying member to an adequate layer thickness. On the other hand, when the thickness of the substrate 2 is 2.0 mm or smaller, a developing blade easily follows a developer carrying member, and spring properties that impart necessary pressure to toner are obtained.

When the resin layer 3 and the substrate 2 are made of a single material which is a resin, extrusion molding, coating molding, sheet laminate molding, injection molding or the like can be used as a method for forming the substrate. Specifically, for the extrusion molding, a sheet metal member coated, if necessary, with an adhesive is placed in a mold. A thermoplastic resin melted by heating is injected to the mold and molded. For the sheet laminate molding, a thermoplastic resin molded into a sheet by extrusion molding or the like is laminated to a sheet metal member coated with an adhesive. For the injection molding, a thermoplastic resin is injected into a mold cavity and molded by cooling.

Next, the electrophotographic member according to one aspect of the present invention having a roller shape (hereinafter, also referred to as an "electrophotographic roller") will be described below.

The substrate 2 also functions as a supporting member and in some cases, an electrode, in the electrophotographic roller. The substrate 2 is made of an electro-conductive material including: metals or alloys such as aluminum, copper alloys and stainless steel; iron plated with chromium or nickel; and synthetic resins having electro-conductivity. For the roller-shaped electrophotographic member, the substrate 2 is in a solid cylindrical or hollow cylindrical form.

<Elastic Layer>

The elastic layer 4 imparts, to the electrophotographic roller, elasticity necessary for forming a nip having a predetermined width, particularly at the contact portion between the electrophotographic roller and a photosensitive member drum. The elastic layer 4 can be a molded article of a rubber material. Examples of the rubber material include ethylene-propylene-diene copolymer rubber, acrylonitrile-butadiene rubber, chloroprene rubber, natural rubber, isoprene rubber, styrene-butadiene rubber, fluorine rubber, silicone rubber, epichlorohydrin rubber and urethane rubber. These rubber materials can be used each alone or as a mixture of two or more thereof. Among these rubber materials, silicone rubber can be used from the viewpoint of compression set and flexibility. Examples of the silicone rubber include a cured product of addition cure silicone rubber.

Examples of a method for forming the elastic layer 4 include a method which involves molding a liquid rubber material in a die, and a method which involves extrusion-molding a kneaded rubber material. The thickness of the elastic layer can be 0.3 mm or larger and 4.0 mm or smaller.

The elastic layer 4 appropriately contains an electro-conductivity imparting agent in order to impart electro-conductivity thereto. Examples of the electro-conductivity imparting agent that can be used include: carbon black; electro-conductive metals such as aluminum and copper; and fine particles of electro-conductive metal oxides such as tin oxide and titanium oxide. Among these electroconductivity imparting agents, carbon black can be used because the carbon black is relatively easily available and produces favorable electro-conductivity. In the case of using carbon black as the electro-conductivity imparting agent, 2 to 50 parts by mass thereof can be contained with respect to 100 parts by mass of the rubber material.

The elastic layer 4 may appropriately contain various additives such as a non-electro-conductive filler, a cross-linking agent and a catalyst. Examples of the non-electro-conductive filler include silica, quartz powders, titanium oxide and calcium carbonate. Examples of the cross-linking agent include di-t-butyl peroxide, 2,5-dimethyl-2,5-di(t-butylperoxy)hexane and dicumyl peroxide. Examples of the catalyst include platinum catalysts.

<Resin Layer>

Hereinafter, the configuration of the resin layer 3 in one embodiment of the electrophotographic member will be described in detail. The resin layer 3 contains a resin having at least one cationic structure selected from the group consisting of the structural formulas (1), (2) and (3), and an anion. The resin further has a structure of at least one of the structural formulas (4) and (5). Hereinafter, the structures represented by the structural formulas (1), (2), (3), (4) and (5) are also referred to as a structure (1), a structure (2), a structure (3), a structure (4) and a structure (5), respectively.

The structures represented by the structural formulas (1), (2) and (3) wherein the nitrogen atom is cationized are each formed through the reaction of an imide compound with a nitrogen-containing resin (polyamide resin, polyurethane resin or polyurea resin). First, the imide compound is heated so that hydrocarbon bonded to the nitrogen atom of the imide is broken to form an imide anion and a carbocation. Then, the carbocation nucleophilically attacks the nitrogen atom in the nitrogen-containing resin (nitrogen atom in the amide skeleton of a polyamide resin, nitrogen atom in the urethane skeleton of a polyurethane resin, or nitrogen atom in the urea skeleton of a polyurea resin) to produce a resin having a structure represented by any of the structural formulas (1), (2) and (3).

Specifically, these characteristic structures (1) to (3) are each obtained by reacting the following imide compound (I) with the following resin (II):

(I) an imide compound having a fluorosulfonylamino group or a fluoroalkylsulfonylamino group bonded to both ends of the structure (4) or the end of the structure (5), and (II) a polyamide resin, a polyurethane resin or a polyurea resin.

Specifically, the resin layer according to the present invention contains a resin having a cationic structure and an anion, which are reaction products of the imide compound (I) and the resin (II).

The resin obtained through the reaction of the imide compound having the structure (4) with the resin (II) has a cross-linked structure after the reaction, whereas the resin obtained using the imide compound having the structure (5) does not have a cross-linked structure and is therefore less likely to have high crystallinity. Accordingly, in the present invention, the resin can further contain a structure represented by the structural formula (5).

Examples of the compound having a fluorosulfonylamino group or a fluoroalkylsulfonylamino group bonded to both ends of the structure (4) include the following N,N,N',N'-tetra(trifluoromethanesulfonyl)-dodecane-1,12-diamine:

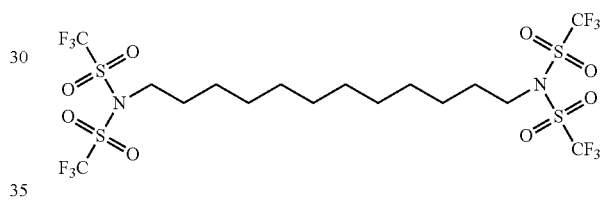

The N,N,N',N'-tetra(trifluoromethanesulfonyl)-dodecane-1,12-diamine and a polyamide resin (trade name: Pebax® 4033, manufactured by Arkema S.A.) are heated and kneaded to obtain compounds having structures given below. Specifically, the reaction yields a resin having a cationic structure as reaction products of the nitrogen atom in the polyamide resin and the carbocation form of the dodecanyl group and a bis(trifluoromethanesulfonyl)imide anion.

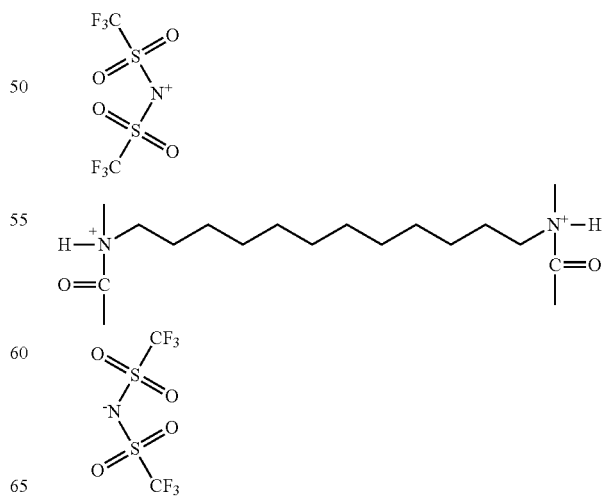

Examples of the imide compound having a fluorosulfonylamino group or a fluoroalkylsulfonylamino group bonded to the end of the structure (5) include the following N-ethyl-bis[(trifluoromethyl)sulfonyl]imide:

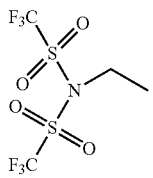

The N-ethyl-bis[(trifluoromethyl)sulfonyl]imide and a polyamide resin (ether ester amide block polymer, trade name: Pebax 4033, manufactured by Arkema S.A.) are heated and kneaded to obtain compounds having structures given below. Specifically, the reaction yields a resin having a cationic structure as reaction products of the nitrogen atom in the polyamide resin and the carbocation form of the ethyl group and a bis(trifluoromethanesulfonyl)imide anion.

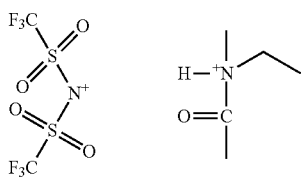

The structures of the compounds after these reactions can be confirmed by analyzing the resin layer using a unit known in the art, for example, pyrolysis GC/MS, FT-IR or NMR.

(Reason why Effects of Present Invention are Obtained)

The present inventors assume that the resin having at least one cationic structure selected from the group consisting of the structural formulas (1), (2) and (3), and the anion produce the effects of the present invention for the following reason:

In the case of adding an ionic electro-conductive agent to a polyamide resin, a polyurethane resin or a polyurea resin, the hydrogen bonds between molecules constituting the resin elevate its crystallinity. Therefore, the ionic electro-conductive agent is limited in its mobility and cannot exert adequate electro-conductivity in some cases. In addition, molecular mobility is reduced in an ultralow-temperature environment. Therefore, this influence is more apparent and volume resistance values is elevated. Thus, a high grade of image quality may not be obtained.

The electrophotographic member of the present invention has at least one cationic structure selected from the group consisting of the structural formulas (1), (2) and (3) in the resin layer. The structures (1), (2) and (3) are structures where the nitrogen atom of an amide group, a urethane group and a urea group, respectively, is cationized. A structure of at least one of the structures (4) and (5) is bonded to the nitrogen atom. Therefore, the formation of a hydrogen bond between amide groups, urethane groups or urea groups is sterically inhibited, as compared with a usual amide group, urethane group or urea group that is not bonded to the structure (4) or (5). Thus, the crystallinity of the resin may be unlikely to be elevated even in a low-temperature region. As a result, the mobility of the anion serving as a carrier becomes less likely to be suppressed and a rise in resistance value is prevented even in an ultralow-temperature environment of about 0° C. Accordingly, an unexpected effect of being able to maintain a high grade of images is probably exerted.

(Resin)

Any of a thermoplastic resin and a thermosetting resin can be used as the resin necessary for forming the resin having any of the structures (1) to (3). Specific examples of the thermoplastic resin include polyurethane resins and polyamide resins. Examples of the thermosetting resin include polyurethane resins and polyurea resins. Alternatively, resins known in the art may be used as a polymer blend according to the need. Among these resins, a thermoplastic resin can be used because of its moldability and convenience of aftertreatment. Among the thermoplastic resins, a polyamide resin can be used from the viewpoint of the strength and abrasion resistance of the resin.

As a thermoplastic polyamide resin known, that in the art can be used. Examples thereof include, but are not limited to, nylon 6, nylon 6,6, nylon 11 and nylon 12. A general thermoplastic resin having a polyamide skeleton can be used.

As a thermoplastic polyurethane resin, that known in the art can be used. Examples thereof include, but are not limited to, polyether polyurethane and polyester polyurethane. A general thermoplastic resin having a polyurethane skeleton can be used.

A polyolefin polyurethane resin, a polycarbonate resin, a polyether polyurethane resin and a polyester polyurethane resin are advantageous in strength and abrasion resistance as the thermosetting polyurethane resin, and can be used because of further having flexibility. These thermosetting polyurethane resins are each obtained through the reaction of a polyol component, such as polyether polyol or polyester polyol, known in the art with an isocyanate compound.

Examples of the polyether polyol include polyethylene glycol, polypropylene glycol and polytetramethylene glycol. Examples of the polyester polyol include polyester polyol obtained by the condensation reaction of a diol component such as 1,4-butanediol, 3-methyl-1,4-pentanediol or neopentyl glycol, and a triol component such as trimethylolpropane with a dicarboxylic acid such as adipic acid, phthalic anhydride, terephthalic acid or hexahydrophthalic acid. These polyol components may be prepared, if necessary, as prepolymers chain-extended with an isocyanate such as 2,4-tolylene diisocyanate (TDI), 1,4-diphenylmethane diisocyanate (MDI) or isophorone diisocyanate (IPDI) in advance.

Examples of the isocyanate compound that can be used in the reaction with the polyol component include, but are not particularly limited to: aliphatic isocyanates such as ethylene diisocyanate and 1,6-hexamethylene diisocyanate (HDI); alicyclic polyisocyanates such as isophorone diisocyanate (IPDI), cyclohexane-1,3-diisocyanate and cyclohexane-1,4-diisocyanate; aromatic polyisocyanates such as 2,4-tolylene diisocyanate, 2,6-tolylene diisocyanate (TDI), 4,4'-diphenylmethane diisocyanate (MDI), polymeric diphenylmethane diisocyanate, xylylene diisocyanate and naphthalene diisocyanate; and their copolymers, isocyanurate forms, TMP adduct forms and biuret forms, and block forms thereof. Among these isocyanate compounds, an aromatic isocyanate such as tolylene diisocyanate, diphenylmethane diisocyanate or polymeric diphenylmethane diisocyanate can be used.

The polyol component and the isocyanate compound can be mixed such that the ratio (molar ratio) of an isocyanate group in the isocyanate compound to 1.0 of a hydroxy group in the polyol is in the range of 1.0 to 2.0. When the mixing ratio falls within the range described above, unreacted components can be prevented from remaining.

The thermosetting polyurea resin used can be obtained by using an amine compound instead of the polyol component used to obtain the thermosetting polyurethane resin, and reacting the amine compound with the isocyanate compound.

Examples of the amine compound include 1,4-diaminobutane, 1,6-diaminohexane, 1,8-diaminooctane, 1,12-diaminododecane, 1,2-bis(2-aminoethoxy)ethane and 1,11-diamino-3,6,9-trioxaundecane. These amine compounds may be prepared, if necessary, as prepolymers chain-extended with an isocyanate such as 2,4-tolylene diisocyanate (TDI), 1,4-diphenylmethane diisocyanate (MDI) or isophorone diisocyanate (IPDI) in advance.

(Description of Specific Resin Structure)

The structures represented by the structural formulas (1) to (3) are each brought about by cationizing the nitrogen atom in the resin. Specifically, the structural formula (1) represents a structure after reaction of a resin having an amide group. The structural formula (2) represents a structure after reaction of a resin having a urethane group. The structural formula (3) represents a structure after reaction of a resin having a urea group. In each structure, each site binding to the nitrogen cation independently has a structure represented by the structural formula (4) or the structural formula (5). X1 in the structural formula (4) is selected from among the structural formulas (X101) to (X105), and X2 in the structural formula (5) is selected from among the structural formulas (X201) to (X205). In the structural formulas (4) and (5), "*" represents a binding moiety for the nitrogen cation in the resin having at least one structure selected from the group consisting of the structural formulas (1), (2) and (3). Hereinafter, specific structures represented by the structural formulas (X101) to (X105) and the structural formulas (X201) to (X205) will be described.

$$—R1—\qquad\text{Structural formula (X101)}$$

In the structural formula (X101), R1 represents a divalent saturated or unsaturated hydrocarbon group having a linear moiety having at least 4 or more carbon atoms. Specific examples of R1 include: linear alkylene groups having 4 to 18 carbon atoms, such as a n-butylene group, a n-hexylene group, a n-octylene group, a n-decylene group, a n-dodecylene group, a n-hexadecylene group and a n-octadecylene group; and unsaturated hydrocarbon groups thereof. The divalent hydrocarbon group may have a branched structure. Specific examples of the divalent hydrocarbon group having a branched structure include a 3-methyl-1,5-pentylene group, a 2,4-dimethyl-1,6-hexylene group and derivatives thereof.

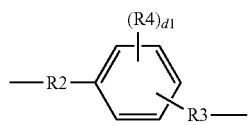

Structural formula (X102)

In the structural formula (X102), R2 and R3 each independently represent a divalent hydrocarbon group having or more and 4 or less carbon atoms. R4 represents a hydrocarbon group having 1 or more and 4 or less carbon atoms. d1 represents 0 or 1. The structural formula (X102) specifically represents a divalent chemical structure having a phenylene structure. In the structural formula (X102), R4 is bonded to any carbon atom substituted by neither R2 nor R3 on the benzene ring carried by the phenylene structure.

Examples of R2 and R3 include linear or branched alkylene groups having 1 or more and 4 or less carbon atoms, such as a methylene group, an ethylene group, a propylene group and a butylene group.

Examples of R4 include linear or branched alkyl groups having 1 or more and 4 or less carbon atoms, such as a methyl group, an ethyl group, a n-propyl group, an isopropyl group, a n-butyl group, an isobutyl group and a t-butyl group.

Examples of the structure represented by the structural formula (X102) include an o-xylylene group, a m-xylylene group, a p-xylylene group, a 1,2-phenylenediethylene group, a 1,3-phenylenediethylene group, a 1,4-phenylenediethylene group, a 1,2-phenylene-di-4-butylene group, a 1,3-phenylene-di-4-butylene group, a 1,4-phenylene-di-4-butylene group and derivatives thereof.

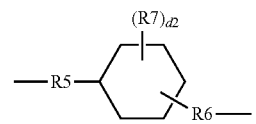

Structural formula (X103)

In the structural formula (X103), R5 and R6 each independently represent a divalent hydrocarbon group having or more and 4 or less carbon atoms. R7 represents a hydrocarbon group having 1 or more and 4 or less carbon atoms. d2 represents 0 or 1. The structural formula (X103) specifically represents a divalent chemical structure having a cyclohexylene structure. In the structural formula (X103), R7 is bonded to any carbon atom substituted by neither R5 nor R6 on the cyclohexane ring carried by the cyclohexylene structure.

Examples of R5 and R6 include linear or branched alkylene groups having 1 or more and 4 or less carbon atoms, such as a methylene group, an ethylene group, a propylene group and a butylene group.

Examples of R7 include linear or branched alkyl groups having 1 or more and 4 or less carbon atoms, such as a methyl group, an ethyl group, a n-propyl group, an isopropyl group, a n-butyl group, an isobutyl group and a t-butyl group.

Examples of the structure represented by the structural formula (X103) include a 1,2-cyclohexanedimethylene group, a 1,3-cyclohexanedimethylene group, a 1,4-cyclohexanedimethylene group, a 1,2-cyclohexane-di-2-ethylene group, a 1,3-cyclohexane-di-2-ethylene group, a 1,4-cyclohexane-di-2-ethylene group and derivatives thereof.

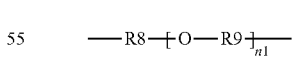

Structural formula (X104)

In the structural formula (X104), R8 and R9 each independently represent a divalent hydrocarbon group having 2 or more and 4 or less carbon atoms. n1 represents an integer of 1 or larger and 4 or smaller. The structural formula (X104) specifically represents a divalent chemical structure having an ether bond.

Examples of R8 and R9 include linear or branched alkylene groups having 2 or more and 4 or less carbon atoms, such as an ethylene group, a propylene group and a butylene group.

Examples of the structure represented by the structural formula (X104) include structures where both ends of diethylene glycol, triethylene glycol, tetraethylene glycol, dipropylene glycol, tripropylene glycol, tetrapropylene glycol, di-tetramethylene ether glycol, tri-tetramethylene ether glycol or tetra-tetramethylene ether glycol are substituted by R8 and R9, respectively.

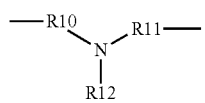
Structural formula (X105)

In the structural formula (X105), R10 and R11 each independently represent a divalent hydrocarbon group having 2 or more and 4 or less carbon atoms. R12 represents a hydrogen atom or a hydrocarbon group having 1 or more and 4 or less carbon atoms. The structural formula (X105) specifically represents a divalent chemical structure having an alkylated tertiary amine or an alkylated secondary amine.

Examples of R10 and R11 include linear or branched alkylene groups having 2 or more and 4 or less carbon atoms, such as an ethylene group, a propylene group and a butylene group.

Examples of the hydrocarbon group having 1 or more and 4 or less carbon atoms, represented by R12 include linear or branched alkyl groups having 1 or more and 4 or less carbon atoms, such as a methyl group, an ethyl group, a n-propyl group, an isopropyl group, a n-butyl group, an isobutyl group and a t-butyl group. The hydrocarbon group having 1 or more and 4 or less carbon atoms may further have a substituent such as a hydroxy group.

Examples of the structure represented by the structural formula (X105) include a N-alkyl-di-2-ethylene group, a N-alkyl-di-3-n-propylene group, a N-alkyl-di-4-n-butylene group, an imino-di-2-ethylene group (HN—(C$_2$H$_4$—)$_2$), an imino-di-3-n-propylene group, an imino-di-4-n-butylene group and derivatives thereof.

—R13          Structural formula (X201)

In the structural formula (X201), R13 represents a hydrocarbon group having 1 or more carbon atoms. Specific examples of R13 include: linear alkyl groups having 1 or more and 16 or less carbon atoms, such as a methyl group, an ethyl group, a butyl group, a hexyl group, an octyl group, a dodecyl group and a hexadecyl group; and unsaturated hydrocarbon groups thereof.

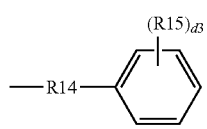
Structural formula (X202)

In the structural formula (X202), R14 represents a divalent hydrocarbon group having 1 or more and 4 or less carbon atoms. R15 represents a hydrocarbon group having 1 or more and 4 or less carbon atoms. d3 represents an integer of 0 or larger and 2 or smaller. The structural formula (X202) specifically represents a monovalent chemical structure having a benzyl structure. In the structural formula (X202), R15 is bonded to any carbon atom unsubstituted by R14 on the benzene ring carried by the benzyl structure.

Examples of R14 include linear or branched alkylene groups having 1 or more and 4 or less carbon atoms, such as a methylene group, an ethylene group, a propylene group and a butylene group.

Examples of R15 include linear or branched alkyl groups having 1 or more and 4 or less carbon atoms, such as a methyl group, an ethyl group, a n-propyl group, an isopropyl group, a n-butyl group, an isobutyl group and a t-butyl group.

Examples of the structure represented by the structural formula (X202) include a benzyl group, a 2-phenylethyl group and a 4-phenylbutyl group.

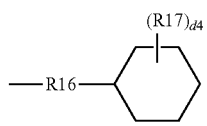
Structural formula (X203)

In the structural formula (X203), R16 represents a divalent hydrocarbon group having 1 or more and 4 or less carbon atoms. R17 represents a hydrocarbon group having 1 or more and 4 or less carbon atoms. d4 represents an integer of 0 or larger and 2 or smaller. The structural formula (X203) specifically represents a monovalent chemical structure having a cyclohexylene structure. In the structural formula (X203), R17 is bonded to any carbon atom unsubstituted by R16 on the cyclohexane ring carried by the cyclohexylene structure.

Examples of R16 include linear or branched alkylene groups having 1 or more and 4 or less carbon atoms, such as a methylene group, an ethylene group, a propylene group and a butylene group.

Examples of R17 include linear or branched alkyl groups having 1 or more and 4 or less carbon atoms, such as a methyl group, an ethyl group, a n-propyl group, an isopropyl group, a n-butyl group, an isobutyl group and a t-butyl group.

Examples of the structure represented by the structural formula (X203) include a cyclohexylmethyl group, a cyclohexylethyl group, a cyclohexylbutyl group and derivatives thereof.

—R18—(—O—R19—)$_{n2}$—O—R20          Structural formula (X204)

In the structural formula (X204), R18 and R19 each independently represent a divalent hydrocarbon group having 2 or more and 4 or less carbon atoms. n2 represents an integer of 1 or larger and 4 or smaller. R20 represents a hydrocarbon group having 1 or more and 6 or less carbon atoms. The structural formula (X204) specifically represents a monovalent chemical structure having an ether bond.

Examples of R18 and R19 include linear or branched alkylene groups having 2 or more and 4 or less carbon atoms, such as an ethylene group, a propylene group and a butylene group. Examples of R20 include linear or branched alkyl groups having 1 or more and 6 or less carbon atoms, such as a methyl group, an ethyl group, a propyl group, a butyl group, a pentyl group and a hexyl group.

Examples of the structure represented by the structural formula (X204) include structures where both ends of diethylene glycol, triethylene glycol, tetraethylene glycol, dipropylene glycol, tripropylene glycol, tetrapropylene glycol, di-tetramethylene ether glycol, tri-tetramethylene ether glycol or tetra-tetramethylene ether glycol are substituted by R18 and R20, respectively.

Structural formula (X205)

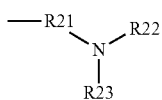

In the structural formula (X205), R21 represents a divalent hydrocarbon group having 2 or more and 4 or less carbon atoms. R22 and R23 each independently represent a hydrogen atom or a hydrocarbon group having 1 or more and 4 or less carbon atoms. The structural formula (X205) specifically represents a monovalent chemical structure having an alkylated tertiary amine, an alkylated secondary amine or an alkylated primary amine.

Examples of R21 include linear or branched alkylene groups having 2 or more and 4 or less carbon atoms, such as an ethylene group, a propylene group and a butylene group.

Examples of the hydrocarbon group having 1 or more and 4 or less carbon atoms, represented by each of R22 and R23 include linear or branched alkyl groups having 1 or more and 4 or less carbon atoms, such as a methyl group, an ethyl group, a n-propyl group, an isopropyl group, a n-butyl group, an isobutyl group and a t-butyl group. The hydrocarbon group having 1 or more and 4 or less carbon atoms may further have a substituent such as a hydroxy group.

Examples of the structure represented by the structural formula (X205) include a N,N-dialkylaminoethyl group, a 3-(N,N-dialkylamino)-n-propyl group, a 4-(N,N-dialkylamino)-n-butyl group, a N-alkylimino-2-ethyl group (HN-(alkyl) ($C_2H_4$—)), a N-alkylimino-3-n-propyl group, a N-alkylimino-4-n-butyl group and derivatives thereof.

(Anion)

The anion will be described below. Examples of the anion include a fluorosulfonylimide anion, a fluoroalkylsulfonylimide anion and derivatives thereof. Specific examples of the fluoroalkylsulfonylimide anion include: fluoroalkylsulfonylimide anions having a fluoroalkyl group having 1 or more and 6 or less carbon atoms, such as a trifluoromethanesulfonylimide anion, a pentafluoroethylsulfonylimide anion, a heptafluoropropylsulfonylimide anion, a nonafluorobutylsulfonylimide anion, a dodecafluoropentylsulfonylimide anion and a perfluorohexylsulfonylimide anion; and cyclic fluoroalkylsulfonylimide anions such as a N,N-hexafluoropropane-1,3-disulfonylimide anion.

(Other Components in Resin Layer)

The resin layer 3 may contain, if necessary, a non-electro-conductive filler such as silica, quartz powders, titanium oxide, zinc oxide or calcium carbonate. The non-electro-conductive filler exerts functions as a film forming aid by addition during heating and kneading in the process of forming the resin layer 3. The content of the non-electro-conductive filler can be 10 parts by mass or larger and 30 parts by mass or smaller with respect to 100 parts by mass of the resin constituting the resin layer 3.

The resin layer 3, the substrate 2 and an arbitrary adhesive layer may each contain, if necessary, an electro-conductive filler without impairing the effects of the present invention. Examples of the electro-conductive filler that can be used include: graphites such as natural graphite and artificial graphite; carbon black; electro-conductive metals such as aluminum, copper, nickel and iron; fine particles of electro-conductive metal oxides such as zinc oxide, tin oxide and titanium oxide; and electro-conductive polymers such as polyaniline, polypyrrole and polyacetylene. These electro-conductive fillers can be used each alone or in combination of two or more thereof according to the need. Among these electro-conductive fillers, carbon black can be particularly used because of having high electro-conductivity imparting properties and reinforcing properties.

Specific examples of the carbon black can include: electro-conductive carbon black such as "Ketjen Black" (trade name, manufactured by Lion Specialty Chemicals Corp.) and acetylene black; and carbon black for rubbers such as SAF, ISAF, HAF, FEF, GPF, SRF, FT and MT. Alternatively, oxidized carbon black for color ink or pyrolytic carbon black can be used. The amount of the carbon black added can be 5 parts by mass or larger and 50 parts by mass or smaller with respect to 100 parts by mass of the resin constituting the resin layer. The content of the carbon black in the resin can be measured using a thermogravimetric analyzer (TGA).

When the electrophotographic member is required to have surface roughness to some extent, a fine particle for regulating roughness (roughness regulating fine particle) may be added to the resin layer 3. A fine particle of a polyurethane resin, a polyester resin, a polyether resin, a polyamide resin, an acrylic resin or a phenol resin can be used as the roughness regulating fine particle. The volume-average particle size of the roughness regulating fine particle can be 1 µm or larger and 15 µm or smaller. The content of the roughness regulating fine particle in the resin layer 3 can be 1 part by mass or larger and 50 parts by mass or smaller with respect to 100 parts by mass of the resin constituting the resin layer 3.

The substrate 2, the resin layer 3 or the adhesive layer can additionally contain a charge controlling agent, a lubricant, a filler, an antioxidant or an antiaging agent without inhibiting the functions of the resin or the rubber described above and electro-conductive agents.

(Method for Forming Resin Layer)

The resin layer 3 can be formed by extrusion molding, coating molding, sheet laminate molding, injection molding or the like. Specifically, for the extrusion molding, a supporting member coated, if necessary, with an adhesive is placed in a mold. The thermoplastic resin melted by heating is injected to the mold and molded. For the sheet laminate molding, the thermoplastic resin molded into a sheet by extrusion molding or the like is laminated to a supporting member coated with an adhesive. For the injection molding, the thermoplastic resin is injected into a mold cavity and molded by cooling.

In order to form the resin layer 3, an adhesive layer can be formed, if necessary, on the substrate 2. Examples of a material for the adhesive layer can include hot-melt adhesives made of polyurethane, polyester, ethylene vinyl alcohol (EVA) or polyamide.

When the resin layer 3 and the substrate 2 are made of different materials, the thickness of the resin layer 3 is not particularly limited and can be 10 µm or larger and 1000 µm or smaller on the contact support surface of the substrate 2. When the thickness of the coating film on the contact support surface of the substrate 2 is 10 µm or larger, durability against abrasion caused by friction to a developer carrying member can be secured. When the thickness of the coating film is 1000 µm or smaller, stable contact pressure with a developer carrying member can be obtained. The position at which the resin layer 3 is formed is not particularly limited. The resin layer 3 may be formed on one side of a supporting member facing a developer carrying member, or may be in a form covering both sides including the non-contact side. The shape of the resin layer 3 in a developer layer thickness regulating member for a developer carrying member is not particularly limited and may be any of flat, curved, convex and concave shapes.

(2) Electrophotographic Apparatus

The electrophotographic member according to one aspect of the present invention can be suitably used as a developing roller, a charging roller, a toner feed roller, a developing blade and a cleaning blade in an electrophotographic apparatus. The electrophotographic member can also be applied to any of a non-contact-type developing apparatus and a contact-type developing apparatus using magnetic monocomponent toner and non-magnetic monocomponent toner, and a developing apparatus using two-component toner.

Figure 3:
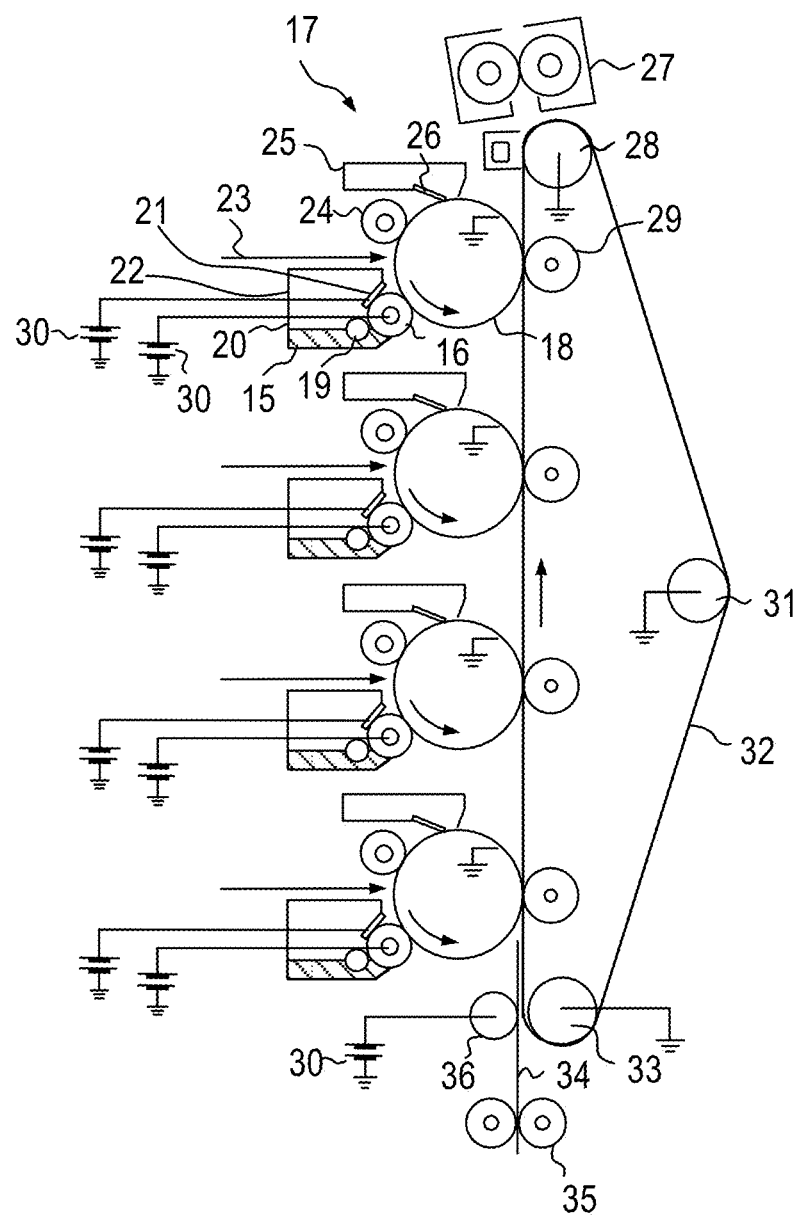
FIG. 3 is a configuration diagram schematically illustrating an electrophotographic apparatus according to one aspect of the present invention.

FIG. 3 is a cross-sectional view schematically illustrating one example of an electrophotographic apparatus equipped with the electrophotographic member according to one aspect of the present invention as a developing roller of a contact-type developing apparatus using monocomponent toner. A developing apparatus 22 includes a toner container 20 which accommodates toner 15 as monocomponent toner, a developing roller 16, a toner feed roller 19 which supplies the toner to the developing roller 16, and a developing blade 21 which regulates the thickness of a toner layer on the developing roller 16. The developing roller 16 is positioned at the opening extending in the longitudinal direction in the toner container 20, and placed in contact with a photosensitive member 18. The photosensitive member 18, a cleaning blade 26, a waste toner container 25 and a charging roller 24 may be disposed in the main body of the electrophotographic apparatus.

Hereinafter, the printing operation of the electrophotographic apparatus will be described. The photosensitive member 18 rotates in the direction indicated by the arrow, and is uniformly charged by the charging roller 24 for the charging treatment of the photosensitive member 18. Subsequently, an electrostatic latent image is formed on the surface of the photosensitive member 18 by laser light 23 which is an exposure unit. The electrostatic latent image is visualized as a toner image (development) by providing the toner 15 from the developing roller 16 placed in contact with the photosensitive member 18 by the developing apparatus 22. The development forms a toner image in an exposed portion and is thus so-called reversal development. The toner image formed on the photosensitive member 18 is transferred to paper 34 (recording medium) by a transferring roller 29 which is a transferring member. The paper 34 is supplied into the apparatus through a paper feed roller 35 and an adsorbing roller 36, and conveyed to between the photosensitive member 18 and the transferring roller 29 by a transfer conveyor belt 32 in an endless belt form. The transfer conveyor belt 32 is operated by a driven roller 33, a driving roller 28 and a tension roller 31. Voltage is applied to the developing roller 16 and the adsorbing roller 36 from a bias power supply 30. The paper 34 to which the toner image has been transferred is fixed by a fixing device and then ejected from the apparatus to terminate the printing operation. Meanwhile, untransferred residual toner, which remains on the photosensitive member 18 without being transferred, is scraped off by the cleaning blade 26 which is a cleaning member for cleaning the surface of the photosensitive member, and accommodated in the waste toner container 25. The cleaned photosensitive member 18 repetitively performs the printing operation mentioned above.

(3) Process Cartridge

Figure 4:
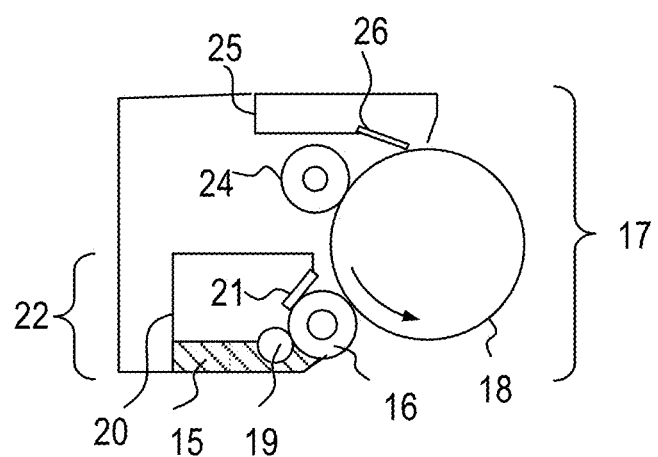
FIG. 4 is a configuration diagram schematically illustrating a process cartridge according to one aspect of the present invention.

The electrophotographic member according to one aspect of the present invention can be suitably used as a developing roller, a charging roller, a toner feed roller, a developing blade and a cleaning blade in a process cartridge. FIG. 4 is a cross-sectional view schematically illustrating one example of the process cartridge according to one aspect of the present invention. A process cartridge 17 illustrated in FIG. 4 is detachably attached to the main body of an electrophotographic apparatus. The process cartridge 17 is equipped with the electrophotographic member as a developing roller 16. The process cartridge 17 also has a developing apparatus 22 including the developing roller and a developing blade 21, an electrophotographic photosensitive member 18, a cleaning blade 26, a waste toner container 25 and a charging roller 24. The developing apparatus 22 further has a toner container 20. The toner container 20 is filled with toner 15. The toner 15 in the toner container 20 is supplied to the surface of the developing roller 16 by a toner feed roller 19. A layer of the toner 15 having a predetermined thickness is formed on the surface of the developing roller 16 by the developing blade 21.

According to one aspect of the present invention, an electrophotographic member that contributes to the formation of a higher grade of an electrophotographic image than ever for use in an ultralow-temperature environment is obtained. According to another aspect of the present invention, a process cartridge and an electrophotographic apparatus that can stably form a high grade of an electrophotographic image are obtained.

EXAMPLES

Hereinafter, the present invention will be specifically described with reference to Examples. First, one example of a method for synthesizing each compound necessary for preparing the resin and the anion according to the present invention will be described.

(Synthesis of Imide Compound IP-1)

As raw material No. 1, 32.0 g of 1,4-dichlorobutane (manufactured by Tokyo Chemical Industry Co., Ltd.) was prepared, and as raw material No. 2, 118.8 g of potassium N,N-bis(fluorosulfonyl)imide (trade name: K-FSI, manufactured by Mitsubishi Materials Electronic Chemicals Co., Ltd.) was prepared. These raw materials were dissolved in 120.0 g of chloroform and heated to reflux for 5 hours. Next, the reaction solution was cooled to room temperature. To the reaction solution, 400 ml of an aqueous solution containing 5% by mass of sodium carbonate was added, and the mixture was stirred for 30 minutes and then separated into aqueous and organic layers. The chloroform layer was washed three times using 240 g of ion exchange water. Next, chloroform was distilled off under reduced pressure to obtain imide compound IP-1 represented by the following structural formula:

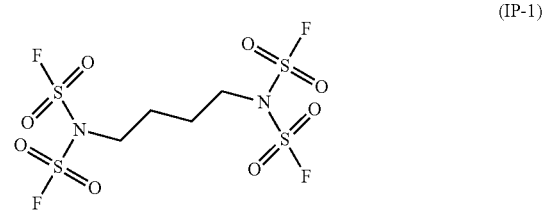 [SMILES: O=S(=O)(F)N(CCCCN(S(=O)(=O)F)S(=O)(=O)F)S(=O)(=O)F]

(IP-1)

(Synthesis of Imide Compounds IP-4, -8, -9, -11 and -12)

Imide compounds IP-4, -8, -9, -11 and -12 were obtained in the same way as in the synthesis of imide compound IP-1 except that raw material No. 1, raw material No. 2 and the amounts of these raw materials used were changed as described in Table 1. The structure of each imide compound is shown below.

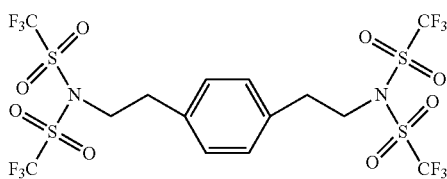
(IP-4)

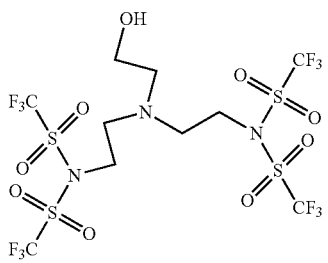
(IP-8)

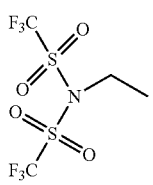
(IP-9)

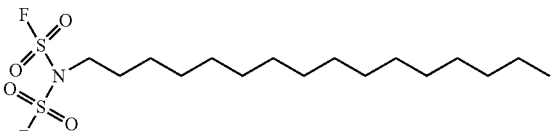
(IP-11)

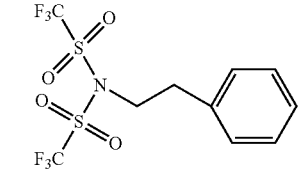
(IP-12)

(Synthesis of Imide Compound IP-3)

As raw material No. 1, 20.0 g of 1,16-hexadecanediol (manufactured by Tokyo Chemical Industry Co., Ltd.) was prepared, and as raw material No. 2, 96.8 g of N,N-bis(nonafluorobutanesulfonyl)imide (trade name: EF-N441, manufactured by Mitsubishi Materials Electronic Chemicals Co., Ltd.) was prepared. These raw materials were dissolved in 120.0 g of chloroform and heated to reflux for 5 hours. Next, the reaction solution was cooled to room temperature. To the reaction mixture, 400 ml of an aqueous solution containing 5% by mass of sodium carbonate was added, and the mixture was stirred for 30 minutes and then separated into aqueous and organic layers. The chloroform layer was washed three times using 240 g of ion exchange water. Next, chloroform was distilled off under reduced pressure to obtain imide compound IP-3 represented by the following structural formula:

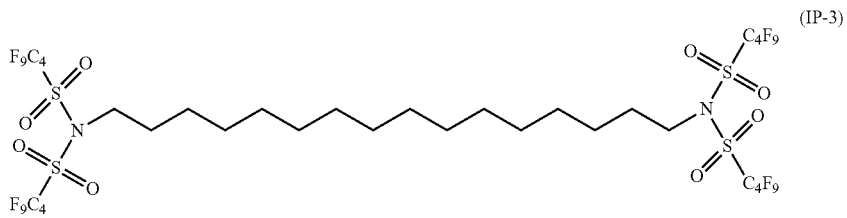
(IP-3)

(Synthesis of Imide Compounds IP-2, -5, -6, -7, -10, -13, -14 and -15)

Imide compounds IP-2, -5, -6, -7, -10, -13, -14 and -15 were obtained in the same way as in the synthesis of imide compound IP-3 except that raw material No. 1, raw material No. 2 and the amounts of these raw materials used were changed as described in Table 1. The structure of each imide compound is shown below.

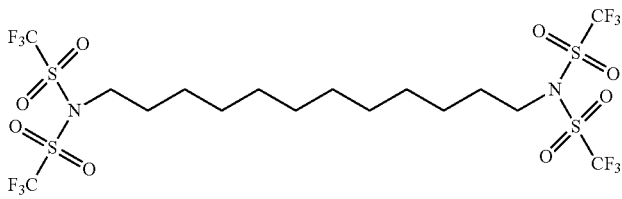
(IP-2)

-continued

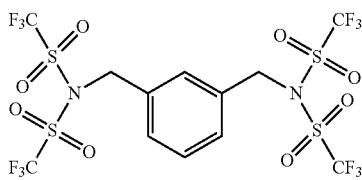
(IP-5)

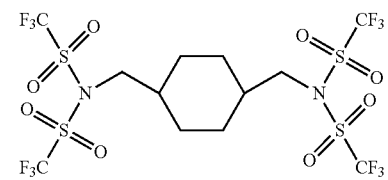
(IP-6)

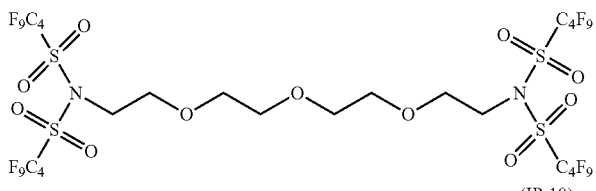
(IP-7)

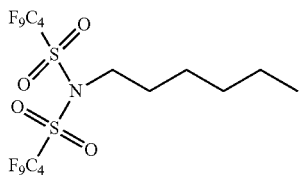
(IP-10)

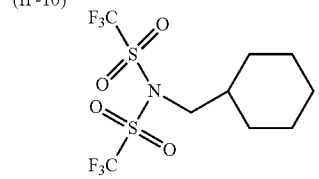
(IP-13)

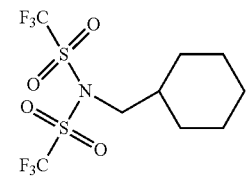
(IP-14)

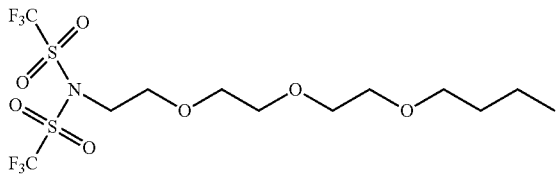
(IP-15)

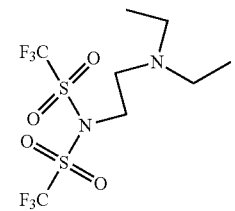

TABLE 1

| Imide compound | Raw material No. 1 | | Raw material No. 2 | |
|---|---|---|---|---|
| | Product name | Amount used (g) | Product name | Amount used (g) |
| IP-1 | 1,4-Dichlorobutane (manufactured by Tokyo Chemical Industry Co., Ltd.) | 32.0 | Potassium N,N-bis(fluorosulfonyl)imide (trade name "K-FSI"; manufactured by Mitsubishi Materials Electronic Chemicals Co., Ltd.) | 118.8 |
| IP-2 | 1,12-Dibromododecane (manufactured by Tokyo Chemical Industry Co., Ltd.) | 40.0 | Lithium N,N-bis(trifluoromethanesulfonyl)imide (trade name "EF-N115"; manufactured by Mitsubishi Materials Electronic Chemicals Co., Ltd.) | 75.3 |
| IP-3 | 1,16-Hexadecanediol (manufactured by Tokyo Chemical Industry Co., Ltd.) | 20.0 | N,N-Bis(nonafluorobutanesulfonyl)imide (manufactured by Wako Pure Chemical Industries, Ltd.) | 96.8 |
| IP-4 | 1,4-Bis(2-chloroethyl)benzene (manufactured by Tokyo Chemical Industry Co., Ltd.) | 30.0 | Lithium N,N-bis(trifluoromethanesulfonyl)imide (trade name "EF-N115"; manufactured by Mitsubishi Materials Electronic Chemicals Co., Ltd.) | 91.2 |
| IP-5 | α,α'-Dibromo-m-xylene (manufactured by Tokyo Chemical Industry Co., Ltd.) | 35.0 | Lithium N,N-bis(trifluoromethanesulfonyl)imide (trade name "EF-N115"; manufactured by Mitsubishi Materials Electronic Chemicals Co., Ltd.) | 81.8 |
| IP-6 | 1,4-Cyclohexanedimethanol (manufactured by Tokyo Chemical Industry Co., Ltd.) | 32.0 | Bis(trifluoromethane)sulfonimide (manufactured by Sigma-Aldrich Co., LLC) | 134.2 |
| IP-7 | Tetraethylene glycol (manufactured by Tokyo Chemical Industry Co., Ltd.) | 20.0 | N,N-Bis(nonafluorobutanesulfonyl)imide (manufactured by Wako Pure Chemical Industries, Ltd.) | 128.7 |
| IP-8 | Triethanolamine (manufactured by Tokyo Chemical Industry Co., Ltd.) | 30.0 | Bis(trifluoromethane)sulfonimide (manufactured by Sigma-Aldrich Co., LLC) | 121.5 |
| IP-9 | Iodoethane (manufactured by Tokyo Chemical Industry Co., Ltd.) | 30.0 | Lithium N,N-bis(trifluoromethanesulfonyl)imide (trade name "EF-N115"; manufactured by Mitsubishi Materials Electronic Chemicals Co., Ltd.) | 60.7 |
| IP-10 | 1-Iodohexane (manufactured by Tokyo Chemical Industry Co., Ltd.) | 28.0 | N,N-Bis(nonafluorobutanesulfonyl)imide (manufactured by Wako Pure Chemical Industries, Ltd.) | 84.4 |

TABLE 1-continued

| Imide compound | Raw material No. 1 Product name | Amount used (g) | Raw material No. 2 Product name | Amount used (g) |
|---|---|---|---|---|
| IP-11 | 1-Iodohexadecane (manufactured by Tokyo Chemical Industry Co., Ltd.) | 36.0 | Potassium N,N-bis(fluorosulfonyl)imide (trade name "K-FSI"; manufactured by Mitsubishi Materials Electronic Chemicals Co., Ltd.) | 24.6 |
| IP-12 | (2-Iodoethyl)benzene (manufactured by Tokyo Chemical Industry Co., Ltd.) | 32.0 | Lithium N,N-bis(trifluoromethanesulfonyl)imide (trade name "EF-N115"; manufactured by Mitsubishi Materials Electronic Chemicals Co., Ltd.) | 43.0 |
| IP-13 | Cyclohexanemethanol (manufactured by Tokyo Chemical Industry Co., Ltd.) | 20.0 | Bis(trifluoromethane)sulfonimide (manufactured by Sigma-Aldrich Co., LLC) | 54.2 |
| IP-14 | Triethylene glycol monobutyl ether (manufactured by Tokyo Chemical Industry Co., Ltd.) | 25.0 | Bis(trifluoromethane)sulfonimide (manufactured by Sigma-Aldrich Co., LLC) | 37.5 |
| IP-15 | 2-Diethylaminoethanol (manufactured by Tokyo Chemical Industry Co., Ltd.) | 20.0 | Bis(trifluoromethane)sulfonimide (manufactured by Sigma-Aldrich Co., LLC) | 52.8 |

Production of Developing Blade

Example 1

(Kneading of Resin)

A polyamide resin (trade name: UBESTA 3014u, manufactured by Ube Industries, Ltd.) of 100 parts by mass and 1.3 parts by mass of imide compound IP-1 were prepared. These materials were added into a kneader and heated and kneaded at 180° C. for 20 minutes to obtain a thermoplastic elastomer composition for use as the resin layer 3. Then, the thermoplastic elastomer composition was added to a single-screw extruder, melted at a temperature of 180° C. to 220° C., and extruded into a melted strand from the nozzle at the tip of the extruder. The strand was cooled and cut to obtain pellets.

(Production of Developing Blade)

The obtained pellets of the thermoplastic elastomer composition were melted at a temperature of 220° C. The thermoplastic elastomer composition was extrusion-molded as the resin layer 3 onto stainless steel (SUS304) having a thickness of 0.08 μm which was a supporting member (substrate 2), and cut into a fixed size. Then, one end of this substrate and a sheet metal were welded with laser to produce a developing blade according to Example 1.

Examples 2, 3, 13, 14 and 15

Developing blades according to Examples 2, 3, 13, 14 and 15 were produced in the same way as in Example 1 except that the imide compound and the amount of the imide compound added (part by mass) were changed as described in Table 2.

Example 4

(Kneading of Resin)

A polyamide resin (trade name: Pebax 4033, manufactured by Arkema S.A.) of 100 parts by mass and 2.2 parts by mass of imide compound IP-4 were prepared. These materials were added into a kneader and heated and kneaded at 160° C. for 20 minutes to obtain a thermoplastic elastomer composition for use as the resin layer 3. Then, the thermoplastic elastomer composition was added to a single-screw extruder, melted at a temperature of 160° C. to 200° C., and extruded into a melted strand from the nozzle at the tip of the extruder. The strand was cooled and cut to obtain pellets.

(Production of Developing Blade)

The obtained pellets of the thermoplastic elastomer composition were melted at a temperature of 200° C. The thermoplastic elastomer composition was extrusion-molded as the resin layer 3 onto stainless steel (SUS304) having a thickness of 0.08 μm which was a supporting member (substrate 2), and cut into a fixed size. Then, one end of this substrate and a sheet metal were welded with laser to produce a developing blade according to Example 4.

Examples 5 to 12

Developing blades according to Examples 5 to 12 were produced in the same way as in Example 4 except that the imide compound and the amount of the imide compound added (part by mass) were changed as described in Table 2.

TABLE 2

| | Resin | Imide compound Compound No. | Amount added with respect to 100 g of resin |
|---|---|---|---|
| Example 1 | Polyamide resin (UBESTA) | IP-1 | 0.00321 mol (1.34 g) |
| Example 2 | | IP-2 | 0.00321 mol (2.34 g) |
| Example 3 | | IP-3 | 0.00321 mol (4.57 g) |
| Example 4 | Polyamide resin (Pebax) | IP-4 | 0.00321 mol (2.22 g) |
| Example 5 | | IP-5 | 0.00321 mol (2.13 g) |
| Example 6 | | IP-6 | 0.00321 mol (2.15 g) |
| Example 7 | | IP-7 | 0.00321 mol (4.37 g) |
| Example 8 | | IP-8 | 0.00321 mol (3.01 g) |
| Example 9 | | IP-9 | 0.00641 mol (2.00 g) |
| Example 10 | | IP-10 | 0.00641 mol (4.43 g) |
| Example 11 | | IP-11 | 0.00641 mol (2.62 g) |
| Example 12 | | IP-12 | 0.00641 mol (2.49 g) |
| Example 13 | Polyamide resin (UBESTA) | IP-13 | 0.00641 mol (2.44 g) |
| Example 14 | | IP-14 | 0.00641 mol (3.04 g) |
| Example 15 | | IP-15 | 0.00641 mol (2.46 g) |

Example 16

(Kneading of resin)

A polyurethane resin (trade name: Resamine P (P-2294), manufactured by Dainichiseika Color & Chemicals Mfg. Co., Ltd.) of 100 parts by mass and 2.3 parts by mass of imide compound IP-2 were prepared. These materials were added into a kneader and heated and kneaded at 156° C. for 20 minutes to obtain a thermoplastic elastomer composition for use as the resin layer 3. Then, the thermoplastic elastomer composition was added to a single-screw extruder, melted at a temperature of 156° C. to 196° C., and extruded into a melted strand from the nozzle at the tip of the extruder. The strand was cooled and cut to obtain pellets.

(Production of Developing Blade)

The obtained pellets of the thermoplastic elastomer composition were melted at a temperature of 196° C. The thermoplastic elastomer composition was extrusion-molded as the resin layer 3 onto stainless steel (SUS304) having a thickness of 0.08 μm which was a supporting member (substrate 2), and cut into a fixed size. Then, one end of this substrate and a sheet metal were welded with laser to produce a developing blade according to Example 16.

Examples 17 to 22

Developing blades according to Examples 17 to 22 were produced in the same way as in Example 16 except that the imide compound and the amount of the imide compound added (part by mass) were changed as described in Table 3.

TABLE 3

|  | Resin | Imide compound | |
|---|---|---|---|
|  |  | Compound No. | Amount added with respect to 100 g of resin |
| Example 16 | Polyurethane resin (Resamine P) | IP-2 | 0.00321 mol (2.34 g) |
| Example 17 |  | IP-4 | 0.00321 mol (2.22 g) |
| Example 18 |  | IP-8 | 0.00321 mol (3.01 g) |
| Example 19 |  | IP-9 | 0.00641 mol (2.00 g) |
| Example 20 |  | IP-11 | 0.00641 mol (2.62 g) |
| Example 21 |  | IP-12 | 0.00641 mol (2.49 g) |
| Example 22 |  | IP-15 | 0.00641 mol (2.46 g) |

Example 23

(Raw Material for Polyurea Resin)

The following raw materials for a polyurea resin for use in a blade member were prepared.

MDI: 4,4'-diphenylmethane diisocyanate (trade name: Millionate MT, manufactured by Nippon Polyurethane Industry Co., Ltd.)

Adipate polyester polyol PBA 2000: polyol of polybutylene adipate (PBA) having a number-average molecular weight of 2000 (trade name: Nipporan 4010, manufactured by Nippon Polyurethane Industry Co., Ltd.)

4,4'-Methylenebis(2-chloroaniline) (manufactured by Tokyo Chemical Industry Co., Ltd.)

Imide compound IP-1

(Production of Developing Blade)

MDI of 28.1 parts by mass and 53.5 parts by mass of adipate polyol PBA 2000 were reacted at 80° C. for 3 hours in a nitrogen atmosphere to obtain a prepolymer having a NCO content of 8.8% by mass. 4,4'-methylenebis(2-chloroaniline) of 18.4 parts by mass and 1.3 parts by mass of imide compound IP-1 were added thereto. Then, while mixed and stirred at 80° C., the mixture was discharged onto stainless steel (SUS304) having a thickness of 0.08 μm which was a supporting member (substrate 2). The thermosetting elastomer composition was molded as the resin layer 3 and cut into a fixed size. One end of this substrate and a sheet metal were welded with laser to produce a developing blade according to Example 23.

Examples 24 to 29

Developing blades according to Examples 24 to 29 were produced in the same way as in Example 23 except that the imide compound and the amount of the imide compound added (part by mass) were changed as described in Table 4.

TABLE 4

|  | Resin | Imide compound | |
|---|---|---|---|
|  |  | Compound No. | Amount added with respect to 100 g of resin |
| Example 23 | Polyurea resin | IP-1 | 0.00321 mol (1.34 g) |
| Example 24 |  | IP-3 | 0.00321 mol (4.57 g) |
| Example 25 |  | IP-5 | 0.00321 mol (2.14 g) |
| Example 26 |  | IP-9 | 0.00641 mol (2.00 g) |
| Example 27 |  | IP-10 | 0.00641 mol (4.43 g) |
| Example 28 |  | IP-12 | 0.00641 mol (2.49 g) |
| Example 29 |  | IP-14 | 0.00641 mol (3.04 g) |

Comparative Example 1

(Kneading of Resin)

A polyamide resin (trade name: Pebax 4033, manufactured by Arkema S.A.) of 100 parts by mass and 1.8 parts by mass of lithium bis(trifluoromethanesulfonyl)imide (manufactured by Tokyo Chemical Industry Co., Ltd.) were prepared. These materials were added into a kneader and heated and kneaded at 160° C. for 20 minutes to obtain a thermoplastic elastomer composition for use as the resin layer 3. Then, the thermoplastic elastomer composition was added to a single-screw extruder, melted at a temperature of 160° C. to 200° C., and extruded into a melted strand from the nozzle at the tip of the extruder. The strand was cooled and cut to obtain pellets.

(Production of Developing Blade)

The obtained pellets of the thermoplastic elastomer composition were melted at a temperature of 200° C. The thermoplastic elastomer composition was extrusion-molded as the resin layer 3 onto stainless steel (SUS304) having a thickness of 0.08 μm which was a supporting member (substrate 2), and cut into a fixed size. Then, one end of this substrate and a sheet metal were welded with laser to produce a developing blade according to Comparative Example 1.

Comparative Examples 2 to 4

Developing blades according to Comparative Examples 2 to 4 were produced in the same way as in Comparative Example 1 except that the imide compound and the amount of the imide compound added (part by mass) were changed as described in Table 5.

TABLE 5

| | Resin | Imide compound Compound | Amount added with respect to 100 g of resin |
|---|---|---|---|
| Comparative Example 1 | Polyamide resin (Pebax) | Lithium bis(trifluoromethanesulfonyl)imide | 0.00641 mol (1.84 g) |
| Comparative Example 2 | | N,N,N-Trimethyl-N-propylammonium bis(trifluoromethanesulfonyl)imide | 0.00641 mol (2.45 g) |
| Comparative Example 3 | | Lithium bis(1,1,2,2,3,3,4,4,4-nonafluoro-1-butanesulfonyl)imide | 0.00641 mol (3.76 g) |
| Comparative Example 4 | | Lithium bis(fluorosulfonyl)imide | 0.00641 mol (1.20 g) |

<Evaluation of Developing Blade>

The developing blades according to Examples 1 to and Comparative Examples 1 to 4 were subjected to measurement and evaluation given below. The evaluation results are shown in Tables 6 and 7.

[Measurement of Electrical Resistance Value of Developing Blade]

The electrical resistance value of each developing blade was measured in each environment after the developing blade was left in an environment involving a temperature of 23° C. and a relative humidity of 50% (hereinafter, also referred to as "N/N") and in an environment involving a temperature of 0° C. for 6 hours or longer.

(Measurement of Electrical Resistance Value)

Figure 5A:
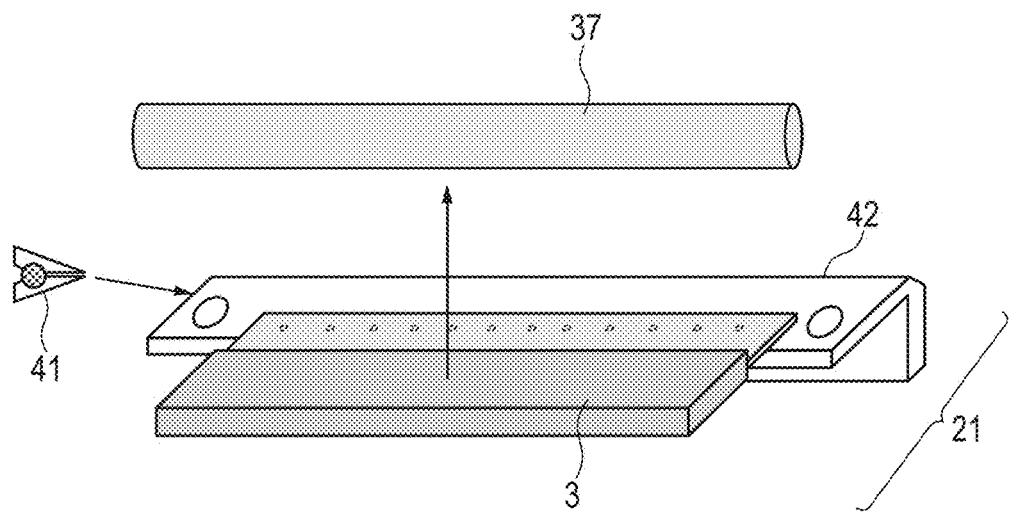
FIGS. 5A and 5B are configuration diagrams schematically illustrating a tool evaluating variations in the resistance value of a blade according to one aspect of the present invention.
Figure 5B:
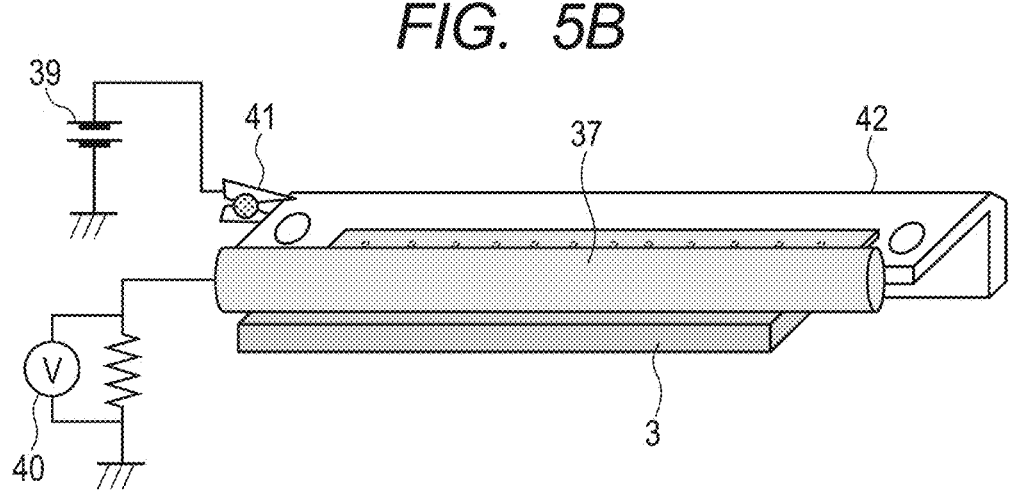

FIGS. 5A and 5B are configuration diagrams schematically illustrating a tool for evaluating the electrical resistance value of a developing blade for use in this measurement. As illustrated in FIG. 5A, a developing blade 21 was loaded such that a resin layer 3 came into contact with a cylindrical metal 37 mounted in the tool. In this operation, a valve for adjustment in the height direction was placed in the tool to mount the developing blade 21 and performed adjustment such that a constant load of 0.3 N/cm was applied to the cylindrical metal 37. Next, as illustrated in FIG. 5B, one end of a sheet metal 42 was held by an electro-conductive clip 41, and voltage (100 V) was applied by a high-voltage power supply 39. Then, potential difference between both ends of a resistor having known electrical resistance (the electrical resistance was at least 2 orders of magnitude smaller than the electrical resistance value of the developing blade), which was disposed between the cylindrical metal 37 and the ground, was measured. In the measurement of the potential difference, a voltmeter 40 (trade name: 189 TRUERMS MULTIMETER, manufactured by Fluke Corp.) was used. Current passing through the cylindrical metal 37 via the developing blade 21 was determined by calculation from the measured potential difference and the electrical resistance of the resistor. Then, the applied voltage of 100 V was divided by the obtained current to determine the electrical resistance value of the developing blade 21. In this context, for the measurement of the potential difference, sampling was performed for 3 seconds from 2 seconds after the voltage application, and a value calculated from an average value thereof was used as the electrical resistance value of the blade.

[Evaluation of Performance as Developing Blade]

(Evaluation of Poor Regulation)

The developing blade of each of Examples and Comparative Examples was attached as the developing blade 21 to a process cartridge for a laser printer (trade name: LBP7700C, manufactured by Canon Inc.) having the configuration illustrated in FIG. 4. Then, the process cartridge was installed into the laser printer. The laser printer was placed in an environment of 0° C. and then left for 2 hours. Next, 100 images having a coverage rate of 1% in black color were continuously output. Then, a solid white image was output to fresh copy paper. After the output of these images, the state of a toner coat on the surface of the developing blade was observed to visually observe the presence or absence of electrostatic toner aggregation (poor regulation) attributed to the abnormal charging of toner. Criteria for the evaluation of poor regulation are as described below. When poor regulation occurs, for example, image defects may arise in such a way that uneven spot patterns are formed in a non-printed portion or a toner mass or the like is formed on an image.

A: poor regulation was absent on the toner coat.
B: poor regulation was present on the toner coat, but did not appear on an image.
C: poor regulation appeared on an image.

TABLE 6

| | Resin structure after reaction | Functional group to be introduced | Anion | N/N blade resistance (Ω) | 0° C. blade resistance (Ω) | (0° C. resistance)/ (N/N resistance) | 0° C. poor regulation |
|---|---|---|---|---|---|---|---|
| Example 1 | (1) + (4) | (X101) | N,N-Bis(fluorosulfonyl)imide ion | 7.45E+06 | 7.75E+07 | 10.4 | A |
| Example 2 | | (X101) | N,N-Bis(trifluoromethanesulfonyl)imide ion | 7.31E+06 | 7.75E+07 | 10.6 | A |
| Example 3 | | (X101) | N,N-Bis(nonafluorobutanesulfonyl)imide ion | 7.30E+06 | 7.45E+07 | 10.2 | A |
| Example 4 | (1) + (4) | (X102) | N,N-Bis(trifluoromethanesulfonyl)imide ion | 4.05E+06 | 4.25E+07 | 10.5 | A |
| Example 5 | | (X102) | N,N-Bis(trifluoromethanesulfonyl)imide ion | 4.06E+06 | 4.34E+07 | 10.7 | A |

TABLE 6-continued

| | Resin structure after reaction | Functional group to be introduced | Anion | N/N blade resistance (Ω) | 0° C. blade resistance (Ω) | (0° C. resistance)/ (N/N resistance) | 0° C. poor regulation |
|---|---|---|---|---|---|---|---|
| Example 6 | | (X103) | N,N-Bis(trifluoromethanesulfonyl)imide ion | 4.23E+06 | 4.44E+07 | 10.5 | A |
| Example 7 | | (X104) | N,N-Bis(nonafluorobutanesulfonyl)imide ion | 4.10E+06 | 4.43E+07 | 10.8 | A |
| Example 8 | | (X105) | N,N-Bis(trifluoromethanesulfonyl)imide ion | 4.47E+06 | 4.74E+07 | 10.6 | A |
| Example 9 | (1) + (5) | (X201) | N,N-Bis(trifluoromethanesulfonyl)imide ion | 3.87E+06 | 3.75E+07 | 9.7 | A |
| Example 10 | | (X201) | N,N-Bis(nonafluorobutanesulfonyl)imide ion | 3.80E+06 | 3.65E+07 | 9.6 | A |
| Example 11 | | (X201) | N,N-Bis(fluorosulfonyl)imide ion | 4.00E+06 | 3.76E+07 | 9.4 | A |
| Example 12 | | (X202) | N,N-Bis(trifluoromethanesulfonyl)imide ion | 3.80E+06 | 3.69E+07 | 9.7 | A |
| Example 13 | (1) + (5) | (X203) | N,N-Bis(trifluoromethanesulfonyl)imide ion | 6.90E+06 | 6.56E+07 | 9.5 | A |
| Example 14 | | (X204) | N,N-Bis(trifluoromethanesulfonyl)imide ion | 6.70E+06 | 6.37E+07 | 9.5 | A |
| Example 15 | | (X205) | N,N-Bis(trifluoromethanesulfonyl)imide ion | 6.74E+06 | 6.34E+07 | 9.4 | A |

TABLE 7

| | Resin structure after reaction | Functional group to be introduced | Anion | N/N blade resistance (Ω) | 0° C. blade resistance (Ω) | (0° C. resistance)/ (N/N resistance) | 0° C. poor regulation |
|---|---|---|---|---|---|---|---|
| Example 16 | (2) + (4) | (X101) | N,N-Bis(trifluoromethanesulfonyl)imide ion | 4.45E+06 | 4.76E+07 | 10.7 | A |
| Example 17 | | (X102) | N,N-Bis(trifluoromethanesulfonyl)imide ion | 4.31E+06 | 4.35E+07 | 10.1 | A |
| Example 18 | | (X105) | N,N-Bis(trifluoromethanesulfonyl)imide ion | 4.30E+06 | 4.39E+07 | 10.2 | A |
| Example 19 | (2) + (5) | (X201) | N,N-Bis(trifluoromethanesulfonyl)imide ion | 3.87E+06 | 3.79E+07 | 9.8 | A |
| Example 20 | | (X201) | N,N-Bis(fluorosulfonyl)imide ion | 3.88E+06 | 3.80E+07 | 9.8 | A |
| Example 21 | | (X202) | N,N-Bis(trifluoromethanesulfonyl)imide ion | 3.90E+06 | 3.78E+07 | 9.7 | A |
| Example 22 | | (X205) | N,N-Bis(trifluoromethanesulfonyl)imide ion | 3.91E+06 | 3.75E+07 | 9.6 | A |
| Example 23 | (3) + (4) | (X101) | N,N-Bis(fluorosulfonyl)imide ion | 1.50E+07 | 1.58E+08 | 10.5 | B |
| Example 24 | | (X101) | N,N-Bis(nonafluorobutanesulfonyl)imide ion | 1.50E+07 | 1.61E+08 | 10.7 | B |
| Example 25 | | (X102) | N,N-Bis(trifluoromethanesulfonyl)imide ion | 1.32E+07 | 1.45E+08 | 11.0 | B |
| Example 26 | (3) + (5) | (X201) | N,N-Bis(trifluoromethanesulfonyl)imide ion | 1.45E+07 | 1.48E+08 | 10.2 | B |
| Example 27 | | (X201) | N,N-Bis(nonafluorobutanesulfonyl)imide ion | 1.72E+07 | 1.74E+08 | 10.1 | B |
| Example 28 | | (X202) | N,N-Bis(trifluoromethanesulfonyl)imide ion | 1.50E+07 | 1.53E+08 | 10.2 | B |

TABLE 7-continued

| | Resin structure after reaction | Functional group to be introduced | Anion | N/N blade resistance (Ω) | 0° C. blade resistance (Ω) | (0° C. resistance)/ (N/N resistance) | 0° C. poor regulation |
|---|---|---|---|---|---|---|---|
| Example 29 | | (X204) | N,N-Bis(trifluoromethanesulfonyl)imide ion | 1.50E+07 | 1.55E+08 | 10.3 | B |
| Comparative Example 1 | — | — | N,N-Bis(trifluoromethanesulfonyl)imide ion | 4.05E+06 | 5.87E+08 | 145 | C |
| Comparative Example 2 | — | — | N,N-Bis(trifluoromethanesulfonyl)imide ion | 3.92E+06 | 5.17E+08 | 132 | C |
| Comparative Example 3 | — | — | N,N-Bis(nonafluorobutanesulfonyl)imide ion | 5.03E+06 | 8.55E+08 | 170 | C |
| Comparative Example 4 | — | — | N,N-Bis(fluorosulfonyl)imide ion | 3.77E+06 | 4.52E+08 | 120 | C |

As shown in Tables 6 and 7, the developing blades according to Examples 1 to 29, each of which contained a resin having at least one structure selected from the group consisting of the structural formulas (1), (2) and (3), and an anion, the resin further having a structure of at least one of the structural formulas (4) and (5), did not cause poor regulation in an environment of 0° C. Furthermore, the developing blade containing the resin having the structure (5) not having a cross-linked structure exhibited a smaller rise in resistance value and is thus more suitable, as compared with the developing blade containing the resin having the structure (4) having a cross-linked structure. By contrast, the developing blades according to Comparative Examples 1 to 4 caused poor regulation in an environment of 0° C. This is probably because due to the increased resistance of these developing blades, blade bias was not applied up to a prescribed value so that toner was nonuniformly charged, resulting in the poor regulation.

Production of Developing Roller

Example 30

(Preparation of Substrate)

A stainless steel (SUS304) cored bar of 6 mm in diameter coated with a primer (trade name: DY35-051, manufactured by Dow Corning Toray Co., Ltd.) and baked was prepared as a substrate.

(Formation of Silicone Rubber Elastic Layer)

The substrate thus prepared was placed in a mold. An addition silicone rubber composition obtained by mixing the following materials was injected to a cavity formed in the mold.

Liquid silicone rubber material (trade name: SE6724A/B, manufactured by Dow Corning Toray Co., Ltd.): 100.0 parts by mass Carbon black (trade name: TOKABLACK #4300, manufactured by Tokai Carbon Co., Ltd.): 15.0 parts by mass Platinum catalyst: 0.1 parts by mass Subsequently, the mold was heated so that the silicone rubber was vulcanized and cured at a temperature of 150° C. for 15 minutes. The substrate with the cured silicone rubber layer formed on the periphery was removed from the mold. Then, the cored bar was further heated at a temperature of 180° C. for 1 hour so that the silicone rubber layer was further cured. In this way, elastic roller D-1 having the silicone rubber elastic layer of 12 mm in diameter on the outer periphery of the substrate was produced.

(Formation of Resin Layer)

The following materials were mixed and stirred as materials for the resin layer.

Water-soluble nylon resin (trade name: AQ nylon P-70, manufactured by Toray Industries, Inc.): 100.0 parts by mass Imide compound IP-1: 1.3 parts by mass Silica (trade name: AEROSIL® 200, manufactured by Nippon Aerosil Co., Ltd.) as a filler: 7.2 parts by mass Fine particle of a polyurethane resin (trade name: ArtPearl C-400, manufactured by Negami Chemical Industrial Co., Ltd.) as a roughness regulating fine particle: 7.2 parts by mass Next, isobutyl alcohol was added at a total solid content ratio of 30% by mass to the obtained mixed solution, followed by mixing in a sand mill. Subsequently, the viscosity was adjusted to 10 to 12 mPa·s further using isobutyl alcohol to prepare a coating material for resin layer formation.

The elastic roller D-1 prepared beforehand was immersed in the coating material for resin layer formation to form a coating film of the coating material on the surface of the elastic layer of the elastic roller D-1. The coating film was dried. The coating material was further cured by heat treatment at a temperature of 150° C. for 1 hour to produce a developing roller according to Example 30 in which the resin layer having a film thickness of approximately 15 μm was disposed on the outer periphery of the elastic layer.

Example 31

A developing roller according to Example 31 was produced in the same way as in Example 30 except that the imide compound and the amount of the imide compound contained were changed as described in Table 8.

Example 32

(Preparation of Substrate)

Elastic roller D-1 was prepared in the same way as in Example 30.

(Synthesis of Isocyanate Group-Terminated Prepolymer B-1)

200.0 g of polyether polyol (trade name: PTG-L3000, manufactured by Hodogaya Chemical Co., Ltd.) was gradually added dropwise to 80.0 g of polymeric MDI (trade name: Cosmonate MDI, manufactured by Mitsui Chemicals, Inc.) in a glass reactor in a nitrogen atmosphere, while the temperature of the reaction solution was kept at 65° C. After the completion of the dropwise addition, the mixture was reacted at a temperature of 65° C. for 2 hours. The obtained reaction mixture was cooled to room temperature to obtain 220.5 g of isocyanate group-terminated urethane prepolymer B-1.

(Formation of Resin Layer)

The following materials were mixed and stirred as materials for the resin layer.

Polyether polyol (trade name: Excenol 500ED, manufactured by Asahi Glass Co., Ltd.): 7.7 parts by mass Isocyanate group-terminated prepolymer B-1: 92.3 parts by mass Imide compound IP-4: 2.2 parts by mass N,N-Dimethyl-n-octylamine (manufactured by Tokyo Chemical Industry Co., Ltd.): 0.25 parts by mass Silica (trade name: AEROSIL 200, manufactured by Nippon Aerosil Co., Ltd.) as a filler: 7.2 parts by mass Fine particle of a polyurethane resin (trade name: ArtPearl C-400, manufactured by Negami Chemical Industrial Co., Ltd.) as a roughness regulating fine particle: 7.2 parts by mass Next, methyl ethyl ketone was added at a total solid content ratio of 30% by mass to the obtained mixed solution, followed by mixing in a sand mill. Subsequently, the viscosity was adjusted to 10 to 12 mPa·s further using methyl ethyl ketone to prepare a coating material for resin layer formation.

The elastic roller D-1 prepared beforehand was immersed in the coating material for resin layer formation to form a coating film of the coating material on the surface of the elastic layer of the elastic roller D-1. The coating film was dried. The coating material was further cured by heat treatment at a temperature of 150° C. for 1 hour to produce a developing roller according to Example 32 in which the resin layer having a film thickness of approximately 15 μm was disposed on the outer periphery of the elastic layer.

Example 33

A developing roller according to Example 33 was produced in the same way as in Example 32 except that the imide compound and the amount of the imide compound contained were changed as described in Table 8.

Example 34

(Preparation of Substrate)

Elastic roller D-1 was prepared in the same way as in Example 30.

(Formation of Resin Layer)

The following materials were mixed and stirred as materials for the resin layer.

4,4'-Methylenebis(2-chloroaniline) (manufactured by Tokyo Chemical Industry Co., Ltd.): 9.1 parts by mass Isocyanate group-terminated prepolymer B-1: 90.9 parts by mass Imide compound IP-6: 2.2 parts by mass Silica (trade name: AEROSIL 200, manufactured by Nippon Aerosil Co., Ltd.) as a filler: 7.2 parts by mass Fine particle of a polyurethane resin (trade name: ArtPearl C-400, manufactured by Negami Chemical Industrial Co., Ltd.) as a roughness regulating fine particle: 7.2 parts by mass Next, methyl ethyl ketone was added at a total solid content ratio of 30% by mass to the obtained mixed solution, followed by mixing in a sand mill. Subsequently, the viscosity was adjusted to 10 to 12 mPa·s further using methyl ethyl ketone to prepare a coating material for resin layer formation.

The elastic roller D-1 prepared beforehand was immersed in the coating material for resin layer formation to form a coating film of the coating material on the surface of the elastic layer of the elastic roller D-1. The coating film was dried. The coating material was further cured by heat treatment at a temperature of 150° C. for 1 hour to produce a developing roller according to Example 34 in which the resin layer having a film thickness of approximately 15 μm was disposed on the outer periphery of the elastic layer.

Comparative Example 5

(Preparation of Substrate)

Elastic roller D-1 was prepared in the same way as in Example 30.

(Formation of Resin Layer)

The following materials were mixed and stirred as materials for the resin layer.

Polyether polyol (trade name: Excenol 500ED, manufactured by Asahi Glass Co., Ltd.): 7.7 parts by mass Isocyanate group-terminated prepolymer B-1: 92.2 parts by mass Lithium bis(trifluoromethanesulfonyl)imide (trade name: EF-N115, manufactured by Mitsubishi Materials Electronic Chemicals Co., Ltd.) as an ionic electro-conductive agent: 1.8 g (0.00642 mol)

N,N-Dimethyl-n-octylamine (manufactured by Tokyo Chemical Industry Co., Ltd.): 0.25 parts by mass Silica (trade name: AEROSIL 200, manufactured by Nippon Aerosil Co., Ltd.) as a filler: 7.2 parts by mass Fine particle of a polyurethane resin (trade name: ArtPearl C-400, manufactured by Negami Chemical Industrial Co., Ltd.) as a roughness regulating fine particle: 7.2 parts by mass Next, methyl ethyl ketone was added at a total solid content ratio of 30% by mass to the obtained mixed solution, followed by mixing in a sand mill. Subsequently, the viscosity was adjusted to 10 to 12 mPa·s further using methyl ethyl ketone to prepare a coating material for resin layer formation.

The elastic roller D-1 prepared beforehand was immersed in the coating material for resin layer formation to form a coating film of the coating material on the surface of the elastic layer of the elastic roller D-1. The coating film was dried. The coating material was further cured by heat treatment at a temperature of 150° C. for 1 hour to produce a developing roller according to Comparative Example 5 in which the resin layer having a film thickness of approximately 15 μm was disposed on the outer periphery of the elastic layer.

Comparative Example 6

A developing roller according to Comparative Example 6 was produced in the same way as in Comparative Example 5 except that the ionic electro-conductive agent (imide compound) and the amount of the agent added were changed as described in Table 8.

TABLE 8

| | Resin | Imide compound Compound | Amount added with respect to 100 g of resin |
|---|---|---|---|
| Example 30 | Polyamide | IP-1 | 0.00321 mol (1.34 g) |
| Example 31 | resin | IP-12 | 0.00642 mol (2.47 g) |
| Example 32 | Polyurethane | IP-4 | 0.00321 mol (2.22 g) |
| Example 33 | resin | IP-9 | 0.00642 mol (1.99 g) |
| Example 34 | Polyurea resin | IP-6 | 0.00321 mol (2.15 g) |
| Comparative Example 5 | Polyurethane resin | Lithium bis(trifluoromethanesulfonyl)imide (manufactured by Mitsubishi Materials Electronic Chemicals Co., Ltd.) | 0.00642 mol (1.84 g) |
| Comparative Example 6 | | Trimethyl propylammonium bis(trifluoromethanesulfonyl)imide (manufactured by Tokyo Chemical Industry Co., Ltd.) | 0.00642 mol (2.45 g) |

<Evaluation of Developing Roller>

The obtained developing rollers according to Examples 30 to 34 and Comparative Examples 5 and 6 were subjected to evaluation given below. The evaluation results are collectively shown in Tables 9.

[Measurement of Electrical Resistance Value of Developing Roller]

The electrical resistance value of each developing roller was measured in each environment after the developing roller was left in a N/N environment and in an environment involving a temperature of 0° C. for 6 hours or longer.

(Measurement of Electrical Resistance Value)

Figure 6A:
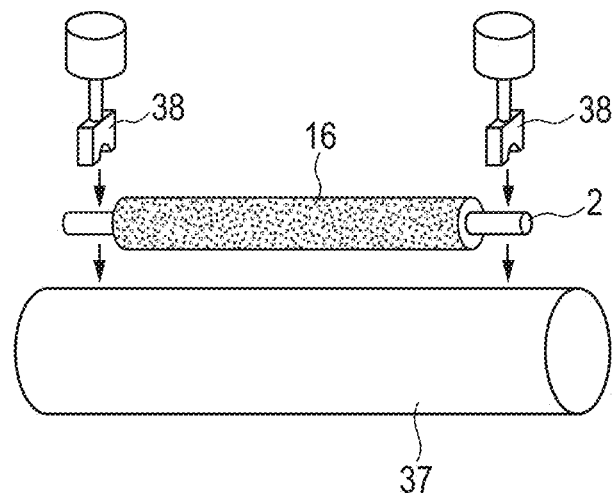
FIGS. 6A and 6B are configuration diagrams schematically illustrating a tool evaluating variations in the resistance value of a roller according to one aspect of the present invention.
Figure 6B:
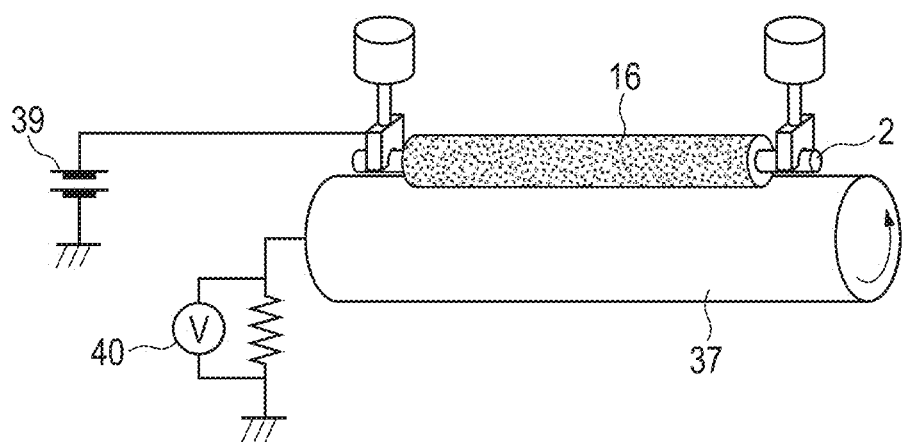

FIGS. 6A and 6B are configuration diagrams schematically illustrating a tool for evaluating the electrical resistance value of a developing roller for use in this measurement. As illustrated in FIG. 6A, both ends of an electro-conductive substrate 2 were pressed at a load of 4.9 N for each via an electro-conductive bearing 38, while a cylindrical metal 37 having a diameter of 30 mm was rotated so that a developing roller 16 was driven to rotate at a speed of 60 rpm. Next, as illustrated in FIG. 6B, voltage of 50 V was applied by a high-voltage power supply 39. Potential difference between both ends of a resistor having known electrical resistance (the electrical resistance was at least 2 orders of magnitude smaller than the electrical resistance value of the developing roller 16), which was disposed between the cylindrical metal 37 and the ground, was measured. In the measurement of the potential difference, a voltmeter 40 (trade name: 189 TRUE-RMS MULTIMETER, manufactured by Fluke Corp.) was used. Current passing through the cylindrical metal 37 via the developing roller 16 was determined by calculation from the measured potential difference and the electrical resistance of the resistor. Then, the applied voltage of 50 V was divided by the obtained current to determine the electrical resistance value of the developing roller 16. In this context, for the measurement of the potential difference, sampling was performed for 3 seconds from 2 seconds after the voltage application, and a value calculated from an average value thereof was used as the electrical resistance value of the roller.

[Evaluation of Performance as Developing Roller]

(Evaluation of Ghost in Environment Involving Temperature of 0° C.)

Each developing roller subjected to the electrical resistance value measurement in an environment involving a temperature of 0° C. was used in the following evaluation.

The developing roller obtained in each of Examples and Comparative Examples was attached as the developing roller 16 to a process cartridge for a laser printer (trade name: LBP7700C, manufactured by Canon Inc.) having the configuration illustrated in FIG. 4. Then, the process cartridge was installed into the laser printer. The laser printer was placed in an environment of 0° C. and then left for 2 hours.

Subsequently, ghost images were evaluated. Specifically, 15 mm black solid square was printed as an image pattern at the front end of one sheet using black toner, and then an entire-surface halftone image was printed on this sheet. Then, uneven density (ghost) in the cycles of the toner carrying member appearing in the halftone portion was visually confirmed. Criteria for the ghost evaluation are as described below.

A: no ghost was found.
B: very slight ghost was found.
C: marked ghost was found.

TABLE 9

| | Resin structure after reaction | Functional group to be introduced | Anion | N/N roller resistance ($\Omega$) | 0° C. roller resistance ($\Omega$) | (0° C. resistance)/ (N/N resistance) | 0° C. ghost |
|---|---|---|---|---|---|---|---|
| Example 30 | (1) + (4) | (X101) | N,N-Bis(fluorosulfonyl)imide ion | 7.45E+06 | 9.09E+07 | 12.2 | A |
| Example 31 | (1) + (5) | (X202) | N,N-Bis(trifluoromethanesulfonyl)imide ion | 6.22E+06 | 6.34E+07 | 10.2 | A |
| Example 32 | (2) + (4) | (X102) | N,N-Bis(trifluoromethanesulfonyl)imide ion | 8.30E+06 | 9.71E+07 | 11.7 | A |
| Example 33 | (2) + (5) | (X201) | N,N-Bis(trifluoromethanesulfonyl)imide ion | 7.53E+06 | 8.21E+07 | 10.9 | A |

TABLE 9-continued

| | Resin structure after reaction | Functional group to be introduced | Anion | N/N roller resistance (Ω) | 0° C. roller resistance (Ω) | (0° C. resistance)/ (N/N resistance) | 0° C. ghost |
|---|---|---|---|---|---|---|---|
| Example 34 | (3) + (4) | (X103) | N,N-Bis(trifluoromethanesulfonyl)imide ion | 4.06E+06 | 6.25E+07 | 15.4 | B |
| Comparative Example 5 | — | — | N,N-Bis(trifluoromethanesulfonyl)imide ion | 7.23E+06 | 7.74E+08 | 107 | C |
| Comparative Example 6 | — | — | N,N-Bis(trifluoromethanesulfonyl)imide ion | 8.07E+06 | 7.83E+08 | 97 | C |

As shown in Table 9, the developing rollers according to Examples 30 to 34, each of which contained a resin having at least one structure selected from the group consisting of the structural formulas (1), (2) and (3), and an anion in the resin layer, the resin further having a structure of at least one of the structural formulas (4) and (5), exhibited a small rise in resistance value and maintained favorable image quality, in a low-temperature environment such as a temperature of 0° C. Furthermore, the developing roller containing the resin having the structure (5) not having a cross-linked structure exhibited a smaller rise in resistance value and is thus more suitable, as compared with the developing roller containing the resin having the structure (4) having a cross-linked structure. By contrast, the developing rollers according to Comparative Examples 5 and 6 having no such specific structure exhibited a rise in resistance value and caused a ghost image, in a low-temperature environment.

Production of Toner Feed Roller

Example 35

A stainless steel (SUS304) cored bar of 5 mm in diameter was placed as the substrate 2 in a mold. Materials given below were mixed, and the resulting urethane rubber composition was mechanically foamed by the mechanical frothing method and injected into the mold of 80° C.

Polyether polyol (trade name: EP550N, manufactured by Mitsui Chemicals & SKC Polyurethanes Inc.): 77.1 parts by mass Isocyanate (trade name: Cosmonate TM20, manufactured by Mitsui Chemicals & SKC Polyurethanes Inc.): 22.7 parts by mass Imide compound IP-7: 2.4 parts by mass Silicone foam stabilizer (trade name: SRX 274, manufactured by Dow Corning Toray Silicone Co., Ltd.): 0.9 parts by mass Amine catalyst (trade name: TOYOCAT-ET, manufactured by Tosoh Corp.): 0.2 parts by mass Amine catalyst (trade name: TOYOCAT-L33, manufactured by Tosoh Corp.): 0.1 parts by mass The injected urethane rubber composition was vulcanized and cured at a temperature of 80° C. for 20 minutes. The substrate with the polyurethane foam layer formed on the periphery was removed from the mold. In this way, the polyurethane foam layer of 17 mm in diameter (the diameter of this product is usually 16.1 mm) was formed on the outer periphery of the substrate 2 to produce a toner feed roller according to Example 35.

Example 36

A stainless steel (SUS304) cored bar of 5 mm in diameter was placed as the substrate 2 in a mold. Materials given below were mixed, and the resulting urethane/urea rubber composition was injected into a cavity formed in the mold.

Polyether polyol (trade name: EP550N, manufactured by Mitsui Chemicals & SKC Polyurethanes Inc.): 77.1 parts by mass Isocyanate (trade name: Cosmonate TM20, manufactured by Mitsui Chemicals & SKC Polyurethanes Inc.): 22.7 parts by mass Imide compound IP-15: 2.4 parts by mass Silicone foam stabilizer (trade name: SRX 274, manufactured by Dow Corning Toray Silicone Co., Ltd.): 0.9 parts by mass Amine catalyst (trade name: TOYOCAT-ET, manufactured by Tosoh Corp.): 0.2 parts by mass Amine catalyst (trade name: TOYOCAT-L33, manufactured by Tosoh Corp.): 0.1 parts by mass Water: 3.0 parts by mass Subsequently, the mold was heated so that the urethane/urea rubber composition was vulcanized and cured by foaming at a temperature of 80° C. for 20 minutes. The substrate with the polyurethane/polyurea foam layer formed on the periphery was removed from the mold. In this way, the polyurea/polyurethane foam layer of 16.1 mm in diameter was formed on the outer periphery of the substrate 2 to produce a toner feed roller according to Example 36.

Comparative Examples 7 and 8

Toner feed rollers according to Comparative Examples 7 and 8 were produced in the same way as in Example 35 except that the type of the imide compound and the amount of the imide compound contained were changed as described in Table 10.

TABLE 10

| | Resin | Imide compound Compound | Amount added with respect to 100 g of resin |
|---|---|---|---|
| Example 35 | Polyurethane resin | IP-7 | 0.00321 mol (2.37 g) |
| Example 36 | Polyurethane/polyurea resin | IP-15 | 0.00642 mol (2.44 g) |
| Comparative Example 7 | Polyurethane resin | Lithium bis(trifluoromethanesulfonyl)imide | 0.00642 mol (1.84 g) |
| Comparative Example 8 | | Trimethyl propylammonium bis(trifluoromethanesulfonyl)imide | 0.00642 mol (2.45 g) |

<Evaluation of Toner Feed Roller>
[Measurement of Electrical Resistance Value of Toner Feed Roller]

The electrical resistance value of each toner feed roller was measured, in the same way as in the measurement of the electrical resistance value of the developing roller, in each environment after the toner feed roller was left in a N/N environment and in an environment involving a temperature of 0° C. for 6 hours or longer. The measurement apparatus used was the same apparatus as that used in the measurement of the electrical resistance value of the developing roller mentioned above except that the load applied to both ends of the substrate 2 was set to 2.5 N for each (a total of 5.0 N), and the number of rotations of the roller in the measurement was set to 32 rpm. The subsequent procedures of the measurement were performed in the same way as in the developing roller to determine the electrical resistance value of the toner feed roller. The results are shown in Table 11.

[Evaluation of Performance as Toner Feed Roller]
(Evaluation of Poor Regulation)

The toner feed roller obtained in each of Examples and Comparative Examples was attached to a process cartridge for a laser printer (trade name: LBP7700C, manufactured by Canon Inc.) having the configuration illustrated in FIG. 4. Then, the process cartridge was installed into the laser printer. The laser printer was placed in an environment of 0° C. and then left for 2 hours. Next, 100 images having a coverage rate of 1% in black color were continuously output. Then, a solid white image was output to fresh copy paper. After the output of these images, the state of a toner coat on the surface of the toner feed roller was observed to visually observe the presence or absence of electrostatic toner aggregation (poor regulation) attributed to the abnormal charging of toner. The observation results were evaluated according to criteria given below. The results are shown in Table 11.

A: poor regulation was absent on the toner coat.
B: poor regulation was present on the toner coat, but did not appear on an image.
C: poor regulation appeared on an image.

TABLE 11

| | Resin structure after reaction | Functional group to be introduced | Anion | N/N roller resistance ($\Omega$) | 0° C. roller resistance ($\Omega$) | (0° C. resistance)/ (N/N resistance) | 0° C. poor regulation |
|---|---|---|---|---|---|---|---|
| Example 35 | (2) + (4) | (X104) | N,N-Bis(nonafluorobutanesulfonyl)imide ion | 1.25E+07 | 1.93E+08 | 15.4 | A |
| Example 36 | (2) + (5), (3) + (5) | (X205) | N,N-Bis(trifluoromethanesulfonyl)imide ion | 9.61E+06 | 1.16E+08 | 12.1 | A |
| Comparative Example 7 | — | — | N,N-Bis(trifluoromethanesulfonyl)imide ion | 9.42E+06 | 2.45E+09 | 260 | C |
| Comparative Example 8 | — | — | N,N-Bis(trifluoromethanesulfonyl)imide ion | 8.07E+06 | 2.42E+09 | 300 | C |

As shown in Table 11, the toner feed rollers according to Examples 35 and 36, each of which contained a resin having at least one structure selected from the group consisting of the structural formulas (1), (2) and (3), and an anion in the resin layer, the resin further having a structure of at least one of the structural formulas (4) and (5), exhibited a small rise in resistance value and maintained favorable image quality, in a low-temperature environment such as a temperature of 0° C. Furthermore, the toner feed roller containing the resin having the structure (5) not having a cross-linked structure exhibited a smaller rise in resistance value and is thus more suitable, as compared with the toner feed roller containing the resin having the structure (4) having a cross-linked structure. By contrast, the toner feed rollers according to Comparative Examples 7 and 8 having no such specific structure exhibited a rise in resistance value and caused poor regulation, in a low-temperature environment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-153945, filed Aug. 4, 2016, which is hereby incorporated by reference herein in its entirety.

What is claimed is:

1. An electrophotographic member having an electroconductive resin layer, the resin layer comprising a resin and an anion, the resin having at least one cationic structure selected from the group consisting of formulae (1), (2) and (3)

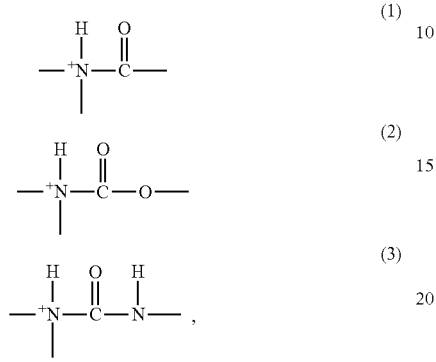

wherein
the resin further comprises a structure of at least one of formulae (4) and (5)

*—X1—*     (4)

where "*" represents a binding moiety for the nitrogen cation in said at least one structure selected from formulae (1), (2) and (3),
X1 represents at least one structure selected from the group consisting of formulae (X101) to (X105)

—R1—     (X101)

where R1 represents a divalent saturated or unsaturated hydrocarbon group having a linear moiety having at least 4 carbon atoms,

where R2 and R3 independently represent a divalent hydrocarbon group having 1 to 4 carbon atoms, R4 represents a hydrocarbon group having 1 to 4 carbon atoms, and d1 represents 0 or 1,

where R5 and R6 independently represent a divalent hydrocarbon group having 1 to 4 carbon atoms, R7 represents a hydrocarbon group having 1 to 4 carbon atoms, and d2 represents 0 or 1, —R8—(—O—R9—)$_{n1}$—     (X104)

where R8 and R9 independently represent a divalent hydrocarbon group having 2 to 4 carbon atoms, and n1 represents an integer of 1 to 4,

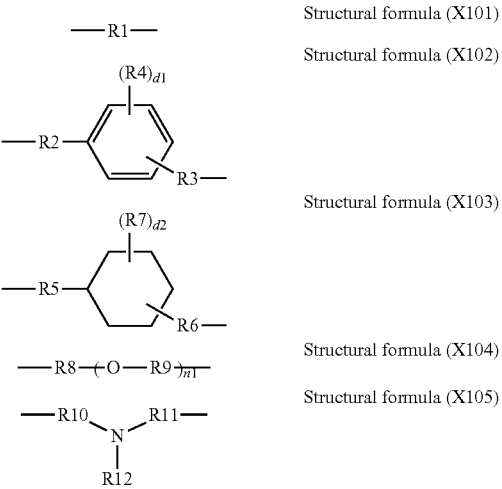

Structural formula (X101)

Structural formula (X102)

Structural formula (X103)

Structural formula (X104)

Structural formula (X105)

where R10 and R11 independently represent a divalent hydrocarbon group having 2 to 4 carbon atoms, and R12 represents a hydrogen atom or a hydrocarbon group having 1 to 4 carbon atoms;

*—X2     (5)

where X2 represents at least one structure selected from the group consisting of formulae (X201) to (X205)

—R13     (X201)

where R13 represents a hydrocarbon group having 1 or more carbon atoms,

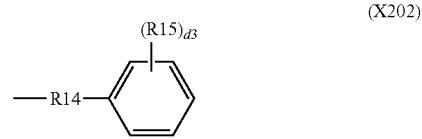

where R14 represents a divalent hydrocarbon group having 1 to 4 carbon atoms, R15 represents a hydrocarbon group having 1 to 4 carbon atoms, and d3 represents an integer of 0 to 2,

where R16 represents a divalent hydrocarbon group having 1 to 4 carbon atoms, R17 represents a hydrocarbon group having 1 to 4 carbon atoms, and d4 represents an integer of 0 to 2, —R18—(—O—R19—)$_{n2}$O—R20     (X204)

R18 and R19 independently represent a divalent hydrocarbon group having 2 to 4 carbon atoms, R20 represents a hydrocarbon group having 1 to 6 carbon atoms, and n2 represents an integer of 1 to 4,

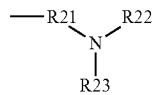 (X205)

where R21 represents a divalent hydrocarbon group having 2 to 4 carbon atoms, and R22 and R23 independently represent a hydrogen atom or a monovalent hydrocarbon group having 1 to 4 carbon atoms.

2. The electrophotographic member according to claim 1, wherein the resin comprises (i) at least one cationic structure selected from the group consisting of formulae (1), (2) and (3), and (ii) the structure represented by formula (5).

3. The electrophotographic member according to claim 1, wherein the anion is at least one anion selected from the group consisting of a fluorosulfonylimide anion, a fluoroalkylsulfonylimide anion and derivatives thereof.

4. An electrophotographic apparatus having a process cartridge detachably attached to a main body thereof, said process cartridge comprising at least one electrophotographic member having an electro-conductive resin layer, the resin layer comprising a resin and an anion, the resin having at least one cationic structure selected from the group consisting of formulae (1), (2) and (3)

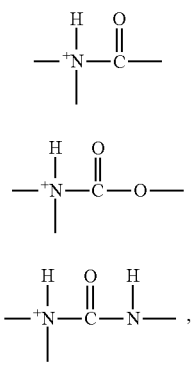

wherein
the resin further comprises a structure of at least one of formulae (4) and (5)

\*—X1—\*  (4)

where "\*" represents a binding moiety for the nitrogen cation in said at least one structure selected from formulae (1), (2) and (3), X1 represents at least one structure selected from the group consisting of formulae (X101) to (X105)

—R1—  (X101)

where R1 represents a divalent saturated or unsaturated hydrocarbon group having a linear moiety having at least 4 carbon atoms,

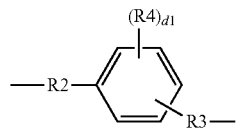 (X102)

where R2 and R3 independently represent a divalent hydrocarbon group having 1 to 4 carbon atoms, R4 represents a hydrocarbon group having 1 to 4 carbon atoms, and d1 represents 0 or 1,

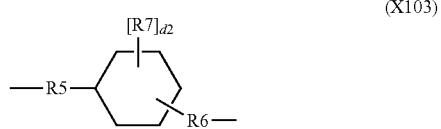 (X103)

where R5 and R6 independently represent a divalent hydrocarbon group having 1 to 4 carbon atoms, R7 represents a hydrocarbon group having 1 to 4 carbon atoms, and d2 represents 0 or 1, —R8—(—O—R9—)$_{n1}$—  (X104)

where R8 and R9 independently represent a divalent hydrocarbon group having 2 to 4 carbon atoms, and n1 represents an integer of 1 to 4,

 (X105)

where R10 and R11 independently represent a divalent hydrocarbon group having 2 to 4 carbon atoms, and R12 represents a hydrogen atom or a hydrocarbon group having 1 to 4 carbon atoms;

where X2 represents at least one structure selected from the group consisting of formulae (X201) to (X205)

—R13  (X201)

where R13 represents a hydrocarbon group having 1 or more carbon atoms,

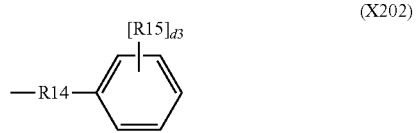 (X202)

where R14 represents a divalent hydrocarbon group having 1 to 4 carbon atoms, R15 represents a hydrocarbon group having 1 to 4 carbon atoms, and d3 represents an integer of 0 to 2,

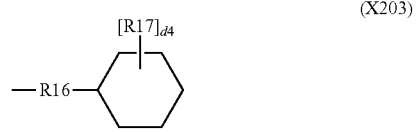 (X203)

where R16 represents a divalent hydrocarbon group having 1 to 4 carbon atoms, R17 represents a hydrocarbon group having 1 to 4 carbon atoms, and d4 represents an integer of 0 to 2,

  (X204)

R18 and R19 independently represent a divalent hydrocarbon group having 2 to 4 carbon atoms, R20 represents a hydrocarbon group having 1 to 6 carbon atoms, and n2 represents an integer of 1 to 4,

  (X205)

where R21 represents a divalent hydrocarbon group having 2 to 4 carbon atoms, and R22 and R23 independently represent a hydrogen atom or a monovalent hydrocarbon group having 1 to 4 carbon atoms.

5. An electrophotographic apparatus comprising at least one electrophotographic member having an electro-conductive resin layer, the resin layer comprising a resin and an anion, the resin having at least one cationic structure selected from the group consisting of formulae (1), (2) and (3)

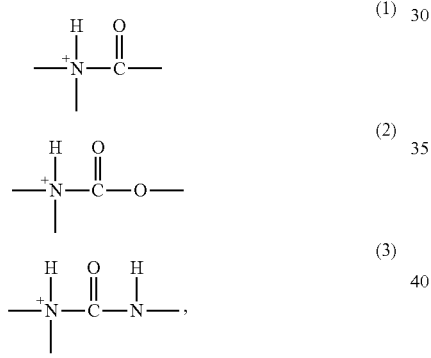

wherein
the resin further comprises a structure of at least one of formulae (4) and (5)

*—X1—*  (4)

where "*" represents a binding moiety for the nitrogen cation in said at least one structure selected from formulae (1), (2) and (3),
X1 represents at least one structure selected from the group consisting of formulae (X101) to (X105)

—R1—  (X101)

where R1 represents a divalent saturated or unsaturated hydrocarbon group having a linear moiety having at least 4 carbon atoms,

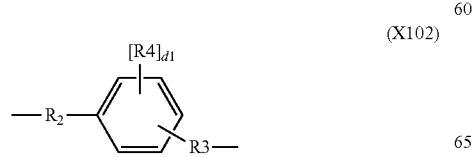  (X102)

where R2 and R3 independently represent a divalent hydrocarbon group having 1 to 4 carbon atoms, R4 represents a hydrocarbon group having 1 to 4 carbon atoms, and d1 represents 0 or 1,

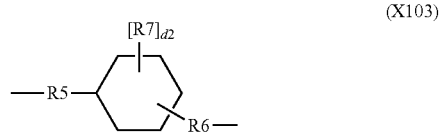  (X103)

where R5 and R6 independently represent a divalent hydrocarbon group having 1 to 4 carbon atoms, R7 represents a hydrocarbon group having 1 to 4 carbon atoms, and d2 represents 0 or 1, —R8—(—O—R9—)$_{n1}$  (X104)

where R8 and R9 independently represent a divalent hydrocarbon group having 2 to 4 carbon atoms, and n1 represents an integer of 1 to 4,

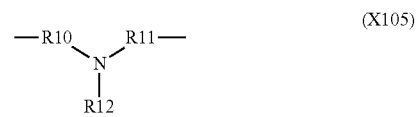  (X105)

where R10 and R11 independently represent a divalent hydrocarbon group having 2 to 4 carbon atoms, and R12 represents a hydrogen atom or a hydrocarbon group having 1 to 4 carbon atoms;

*—X2  (5)

where X2 represents at least one structure selected from the group consisting of formulae (X201) to (X205)

—R13  (X201)

where R13 represents a hydrocarbon group having 1 or more carbon atoms,

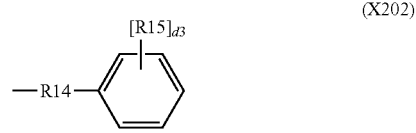  (X202)

where R14 represents a divalent hydrocarbon group having 1 to 4 carbon atoms, R15 represents a hydrocarbon group having 1 to 4 carbon atoms, and d3 represents an integer of 0 to 2,

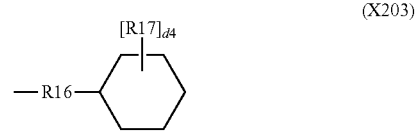  (X203)

where R16 represents a divalent hydrocarbon group having 1 to 4 carbon atoms, R17 represents a hydrocarbon group having 1 to 4 carbon atoms, and d4 represents an integer of 0 to 2,

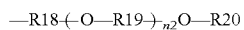 (X204)

R18 and R19 independently represent a divalent hydrocarbon group having 2 to 4 carbon atoms, R20 represents a hydrocarbon group having 1 to 6 carbon atoms, and n2 represents an integer of 1 to 4,

 (X205)

where R21 represents a divalent hydrocarbon group having 2 to 4 carbon atoms, and R22 and R23 independently represent a hydrogen atom or a monovalent hydrocarbon group having 1 to 4 carbon atoms.

* * * * *